United States Patent
Tanaka et al.

(10) Patent No.: US 8,416,480 B2
(45) Date of Patent: Apr. 9, 2013

(54) HOLOGRAM REPRODUCING APPARATUS, HOLOGRAM REPRODUCING METHOD, AND PHASE MODULATING ELEMENT

(75) Inventors: Tomiji Tanaka, Saitama (JP); Masaaki Hara, Tokyo (JP); Kazutatsu Tokuyama, Tokyo (JP); Satoru Seko, Kanagawa (JP); Shinji Yamada, Kanagawa (JP); Hitoshi Okada, Chiba (JP)

(73) Assignee: Sony Corporation, Tokyo (JP)

( * ) Notice: Subject to any disclaimer, the term of this patent is extended or adjusted under 35 U.S.C. 154(b) by 872 days.

(21) Appl. No.: 12/032,536

(22) Filed: Feb. 15, 2008

(65) Prior Publication Data
US 2008/0198432 A1    Aug. 21, 2008

(30) Foreign Application Priority Data
Feb. 20, 2007 (JP) ................... 2007-039165

(51) Int. Cl.
*G03H 1/26* (2006.01)
*G03H 1/10* (2006.01)

(52) U.S. Cl. ............... 359/32; 359/10; 359/11; 359/29; 359/559; 356/237.1

(58) Field of Classification Search ........... 359/9, 10, 359/11, 254, 559, 29; 349/143, 200; 356/511, 356/237.2, 484, 237.1
See application file for complete search history.

(56) References Cited

U.S. PATENT DOCUMENTS

| | | | |
|---|---|---|---|
| 4,224,480 A | 9/1980 | Satoh et al. | |
| 5,216,527 A | 6/1993 | Sharnoff et al. | |
| 5,426,521 A * | 6/1995 | Chen et al. ................ | 359/9 |
| 5,654,782 A * | 8/1997 | Morokawa et al. .......... | 349/143 |
| 6,778,281 B2 * | 8/2004 | Ge ................... | 356/511 |
| 6,831,723 B1 * | 12/2004 | Takeuchi ................ | 349/139 |
| 6,936,761 B2 * | 8/2005 | Pichler ............ | 136/256 |
| 6,999,178 B2 * | 2/2006 | Hanson et al. ............ | 356/484 |
| 7,283,286 B2 | 10/2007 | Fukumoto et al. | |
| 7,379,172 B2 * | 5/2008 | Takata et al. ............. | 356/237.2 |

FOREIGN PATENT DOCUMENTS

| | | |
|---|---|---|
| EP | 0 721 138 | 7/1996 |
| EP | 1 168 055 | 1/2002 |
| EP | 1 895 519 | 3/2008 |

(Continued)

OTHER PUBLICATIONS

Japanese Office Action issued on Dec. 24, 2008, for corresponding Japanese Patent Application JP 2007-039165.

(Continued)

*Primary Examiner* — Audrey Y Chang
(74) *Attorney, Agent, or Firm* — K&L Gates LLP

(57) ABSTRACT

A hologram reproducing apparatus includes a first reference light path leading laser light from a laser light source so that a hologram recording medium is irradiated with first reference light; a diffracted light path leading diffracted light, generated from the hologram recording medium by irradiation with the first reference light, to a light receiving element having a plurality of pixels; and a second reference light path leading second reference light, having the same polarization direction as that of the diffracted light, from the laser light source to the light receiving element. The second reference light path is provided with a phase modulating element so that the phase difference between the diffracted light and the second reference light in a light receiving surface of the light receiving element is adjusted within a predetermined range.

7 Claims, 14 Drawing Sheets

FOREIGN PATENT DOCUMENTS

| | | |
|---|---|---|
| JP | 2002-083431 | 3/2002 |
| JP | 2006-209081 | 8/2006 |
| WO | WO 2005/036539 | 4/2005 |

OTHER PUBLICATIONS

Ballard, G.S. et al., "Double-Exposure Holographic Interferometry With Separate Reference Beams," Journal of Applied Physics, vol. 39, No. 10, pp. 4846-4848 (1968).

Yasuda, S. et al., "Optical Noise Reduction by Reconstructing Positive and Negative Images From Fourier Holograms in Coaxial Holographic Storage Systems," Optical Society of America, vol. 31, No. 11, pp. 1639-1641 (2006).

Joseph, et al. "Homogenized Fourier transform holographic data storage using phase spatial light modulators and methods for recovery of data from the phase image," Applied Optics, vol. 45, pp. 6374-6380, 2006.

* cited by examiner

HOLOGRAM REPRODUCING APPARATUS, HOLOGRAM REPRODUCING METHOD, AND PHASE MODULATING ELEMENT

CROSS REFERENCES TO RELATED APPLICATIONS

The present application claims priority to Japanese Patent Application JP 2007-039165 filed in the Japanese Patent Office on Feb. 20, 2007, the entire contents of which is incorporated herein by reference.

BACKGROUND

The present application relates to a hologram reproducing apparatus, a hologram reproducing method, and a phase modulating element.

In recent years, hologram memories have become a focus of attention as storage devices enabling high-density recording/reproducing. As one of techniques of recording/reproducing information on/from a hologram memory, a technique of recording information by removing zero-order light (DC component) and reproducing it by superimposing coherent light on diffracted light has been suggested (see Non-patent Document 1: Joby Joseph and David A. Waldman "Homogenized Fourier transform holographic data storage using phase spatial light modulators and methods for recovery of data from the phase image" APPLIED OPTICS/Vol. 45, No. 25/1 Pp6374-Pp6380 September 2006; and Patent Document 1: Japanese Unexamined Patent Application Publication No. 2006-209081).

In the technique described in Non-patent Document 1, information is recorded by using a phase modulator, not a spatial modulator to modulate light intensity. In a case of using such a phase modulator, if half of pixels have a phase of 0 and if the other half of pixels have a phase of $\pi$, for example, no zero-order light is generated because laser light beams of opposite phases cancel each other out. On the other hand, in a case of recording information without using a phase modulator, recording by zero-order light is repeated at the same position of a medium, and recording cannot be performed any more after M/# at that position has been used up. Such inconvenience can be avoided by using the phase modulator and M/# can be effectively used advantageously. During reproducing, if the intensity of added light is the same as that of diffracted light and if the phase thereof is 0, the intensity of light in the pixels having a phase of 0 is high in the diffracted light, while the intensity of light in the pixels having a phase of $\pi$ is low due to cancelling, so that recorded information can be reproduced as light and dark patterns. The optical system disclosed in Non-patent document 1 uses a dual beam method.

SUMMARY

However, a further test performed by the inventors listed in the request of the present patent application (hereinafter referred to as the inventors of the present application) has generated a conclusion that it is very difficult to realize phase adjustment between diffracted light generated by applying reference light (first reference light) onto a hologram recording area and an opposite reference light (second reference light) during reproducing. Also, the inventors of the present application have found that this phase adjustment is a challenge to bring hologram memories using the principle described in Non-patent Document 1 into practical use.

The present application in an embodiment is directed to providing a technique of realizing phase adjustment between diffracted light obtained from a hologram recording medium and second reference light during reproducing and a phase modulating element preferably used for such phase adjustment.

A hologram reproducing apparatus according to an embodiment includes a first reference light path leading laser light from a laser light source so that a hologram recording medium is irradiated with first reference light; a diffracted light path leading diffracted light, generated from the hologram recording medium by irradiation with the first reference light, to a light receiving element having a plurality of pixels; and a second reference light path leading second reference light, having the same polarization direction as that of the diffracted light, from the laser light source to the light receiving element. The second reference light path is provided with a phase modulating element so that the phase difference between the diffracted light and the second reference light in a light receiving surface of the light receiving element is adjusted within a predetermined range.

In this hologram reproducing apparatus, the phase difference between the diffracted light and the second reference light in the light receiving surface of the light receiving element is adjusted within the predetermined range by using the phase element provided on the second reference light path. Accordingly, a light and dark image can be obtained as an image generated on the light receiving surface of the light receiving element.

A hologram reproducing method according to an embodiment includes the steps of irradiating a hologram recording medium with first reference light from a laser light source; generating diffracted light from the hologram recording medium based on the first reference light; generating second reference light having the same polarization direction as that of the diffracted light from the laser light source; receiving the diffracted light and the second reference light by a light receiving element including a plurality of pixels; changing the phase of the second reference light in a plane of a traveling direction of the second reference light in accordance with a signal received by the plurality of pixels; and adjusting the phase difference between the diffracted light and the second reference light in a light receiving surface of the light receiving element within a predetermined range.

In this hologram reproducing method, the phase difference between the diffracted light and the second reference light in the light receiving surface of the light receiving element is adjusted within the predetermined range by changing the phase of the second reference light. Accordingly, a light and dark image can be obtained as an image generated on the light receiving surface of the light receiving element.

A phase modulating element according to an embodiment includes liquid crystal causing change in phase of a passing light beam in accordance with an applied voltage; first and second optically-transparent rigid plates holding the liquid crystal by sandwiching the liquid crystal; first and second optically-transparent films that have conductivity and optical transparency and that are provided on surfaces of the first and second rigid plates, respectively; first and second electrodes that are provided in parallel on both ends of the first optically-transparent film and that are made of a material having higher conductivity than that of the first optically-transparent film; and third and fourth electrodes that are provided in parallel on both ends of the second optically-transparent film while being orthogonal to the first and second electrodes and that are made of a material having higher conductivity than that of the second optically-transparent film.

In this phase modulating element, potential is applied to the first and second electrodes so that potential gradient occurs between the first and second electrodes. Also, a change in phase of a light beam according to the potential gradient can be obtained in a one-dimensional direction in a plane. Likewise, potential is applied to the third and fourth electrodes so that potential gradient occurs between the third and fourth electrodes. Also, a change in phase of a light beam according to the potential gradient can be obtained in a one-dimensional direction orthogonal to the above-described one-dimensional direction in a plane. As a result, the phase can be changed over the entire two-dimensional surface.

A phase modulating element according to an embodiment includes liquid crystal causing change in phase of a passing light beam in accordance with an applied voltage; first and second optically-transparent rigid plates holding the liquid crystal by sandwiching the liquid crystal; and a plurality of first parallel electrodes that have conductivity and optical transparency and that are provided on a surface of the first rigid plate and a plurality of second parallel electrodes that have conductivity and optical transparency and that are provided on a surface of the second rigid plate while being orthogonal to the first parallel electrodes.

This phase modulating element includes the plurality of first parallel electrodes that have conductivity and optical transparency and that are provided on the surface of the first rigid plate and the plurality of second parallel electrodes that have conductivity and optical transparency and that are provided on the surface of the second rigid plate. Since the first parallel electrodes are orthogonal to the second parallel electrodes, potential gradients orthogonal to each other can be generated on the two surfaces, so that the phase can be changed over the entire two-dimensional surface.

According to a hologram reproducing technique according to an embodiment, a favorable hologram reproducing characteristic can be obtained through phase adjustment between the diffracted light from the hologram recording medium and the second reference light. Also, a preferable phase modulating element to realize the hologram reproducing technique can be provided.

Additional features and advantages are described herein, and will be apparent from the following Detailed Description and the figures.

DETAILED DESCRIPTION

Figure 1:
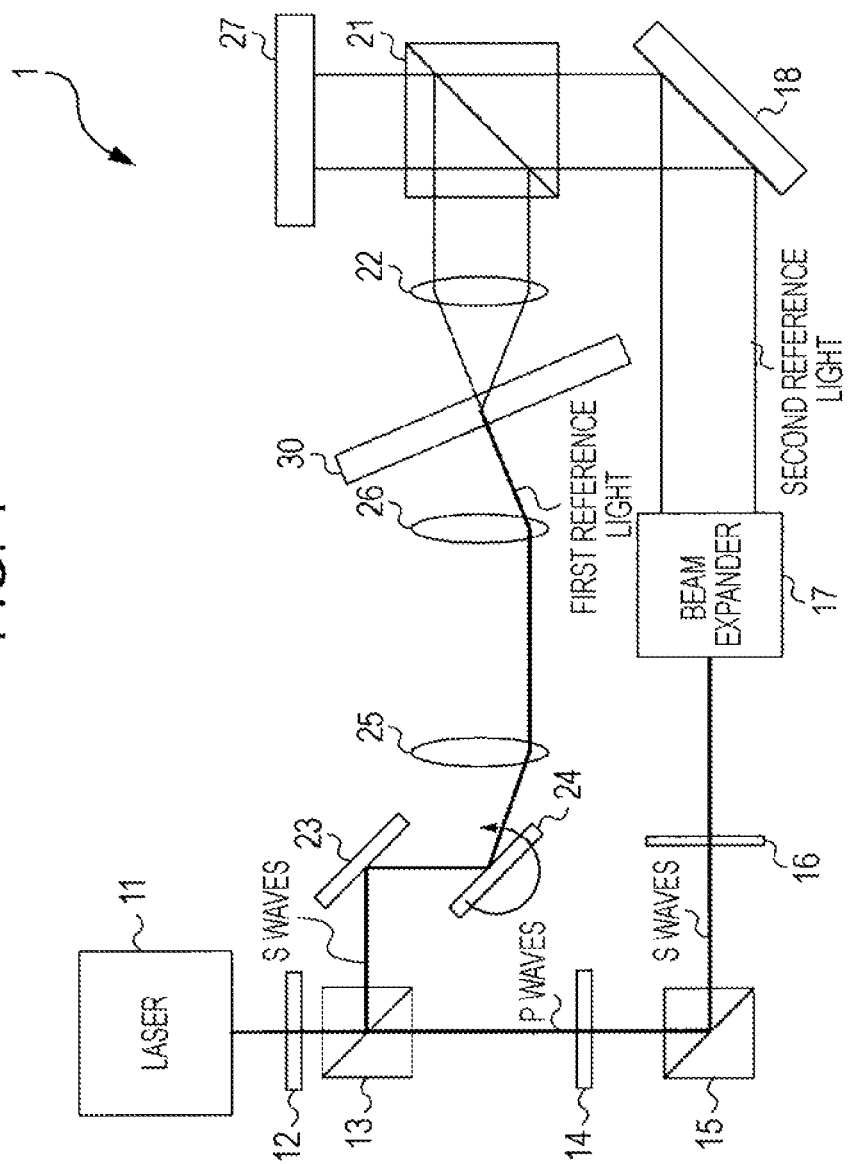
FIG. 1 is a schematic view mainly illustrating an optical unit of a hologram reproducing apparatus according to a first embodiment.

Hereinafter, hologram reproducing apparatuses and hologram reproducing methods according to embodiments and a phase modulating element preferably used for the hologram reproducing apparatuses and the hologram reproducing methods are described in detail.

First, an overview of the embodiments is described.

A basic configuration common to the hologram reproducing apparatuses according to the first to fourth embodiments includes the followings: a first reference light path leading laser light from a laser light source so that a hologram recording medium is irradiated with first reference light; a diffracted light path leading diffracted light, generated from the hologram recording medium by irradiation with the first reference light, to a light receiving element having a plurality of pixels; and a second reference light path leading second reference light, having the same polarization direction as that of the diffracted light, from the laser light source to the light receiving element. The second reference light path is provided with a phase modulating element so that the phase difference between the diffracted light and the second reference light in a light receiving surface of the light receiving element is adjusted within a predetermined range.

Each of the first reference light path, the diffracted light path, and the second reference light path can be in various forms. In the first to third embodiments, the first reference light path and the diffracted light path do not share the same objective lens. However, in the fourth embodiment, the first reference light path and the diffracted light path share the same objective lens.

Also, the phase modulating element can be in various forms. In the first and fourth embodiments, the phase modulating element is constructed as a combination of a phase delay element and a biaxially-turning mirror. In the second embodiment, the phase modulating element is constructed as a biaxially-turning uniaxially-moving mirror. In the third embodiment, the phase modulating element is constructed as a phase modulating element including liquid crystal.

As described above, the second reference light path is provided with the phase modulating element so that the phase difference between the diffracted light and the second reference light on the light receiving surface of a CMOS sensor used as the light receiving element is within a predetermined range in the first to fourth embodiments. Feedforward can be used to adjust the phase difference within the predetermined range. In the first to fourth embodiments, however, the phase generated by the phase modulating element is adjusted by using feedback.

In a basic configuration common to the hologram reproducing methods according to the first to fourth embodiments, a hologram recording medium is irradiated with first reference light from a laser light source; diffracted light is generated from the hologram recording medium based on the first reference light; second reference light having the same polarization direction as that of the diffracted light is generated from the laser light source; the diffracted light and the second reference light are received by a light receiving element including a plurality of pixels; the phase of the second reference light is changed in a plane of a traveling direction of the second reference light in accordance with a signal received by the plurality of pixels; and the phase difference between the diffracted light and the second reference light in a light receiving surface of the light receiving element is adjusted within a predetermined range.

The hologram reproducing apparatus according to the third embodiment adopts a phase modulating element including liquid crystal. In this phase modulating element, liquid crystal is sealed by two optically-transparent rigid plates, and potential gradient is allowed to occur on the surface of each rigid plate, so as to cause a phase difference in accordance with the potential gradient in a plane direction. In the hologram reproducing apparatus, a phase difference in a two-dimensional plane needs to be controlled, so that potential gradient is allowed to occur in orthogonal directions on one surface and the other surface.

For describing a specific configuration to cause potential gradient in orthogonal directions on one surface and the other surface, two embodiments are given below.

The configuration according to one of the two embodiments includes the followings: liquid crystal causing change in phase of a passing light beam in accordance with an applied voltage; first and second optically-transparent rigid plates holding the liquid crystal by sandwiching the liquid crystal; first and second optically-transparent films that have conductivity and optical transparency and that are provided on surfaces of the first and second rigid plates, respectively; first and second electrodes that are provided in parallel on both ends of the first optically-transparent film and that are made of a material having higher conductivity than that of the first optically-transparent film; and third and fourth electrodes that are provided in parallel on both ends of the second optically-transparent film while being orthogonal to the first and second electrodes and that are made of a material having higher conductivity than that of the second optically-transparent film.

The configuration according to the other of the two embodiments includes the followings: liquid crystal causing change in phase of a passing light beam in accordance with an applied voltage; first and second optically-transparent rigid plates holding the liquid crystal by sandwiching the liquid crystal; and a plurality of first parallel electrodes that have conductivity and optical transparency and that are provided on a surface of the first rigid plate and a plurality of second parallel electrodes that have conductivity and optical transparency and that are provided on a surface of the second rigid plate while being orthogonal to the first parallel electrodes.

<Hologram Reproducing Technique According to the First Embodiment>

FIG. 1 is a schematic view of a hologram reproducing apparatus according to the first embodiment to reproduce information by using a hologram recording medium and mainly illustrates an optical unit 1 serving as a main part of the apparatus. Hereinafter, the hologram reproducing apparatus and hologram reproducing method according to the first embodiment are described with reference to FIG. 1.

In the hologram reproducing apparatus including the optical unit 1 illustrated in FIG. 1, a hologram recording medium 30 used in reproducing is a flat plate in a disc shape or a card (rectangular) shape. When the hologram recording medium 30 is in a disc shape, a hole to position the center of rotation is provided on the innermost radius of the hologram recording medium 30. A turntable connected to a rotation motor is fitted to the hole so that the hologram recording medium 30 placed on the turntable is rotated. When the hologram recording medium 30 is in a rectangular shape, the hologram recording medium 30 moves in two mutually orthogonal directions along a plane of the flat plate in the card shape. The hologram recording medium 30 includes a recording layer composed of photopolymer or the like and is a so-called transparent hologram recording medium.

Data including audio information, image information, and information used in a computer are recorded in advance in a hologram form on this hologram recording medium 30. Since the data is recorded by using a method of modulating a phase, as described above in the related art, a difference in phase needs to be converted to a difference in contrast in order to appropriately reproduce the data.

The optical unit 1 of the hologram reproducing apparatus illustrated in FIG. 1 includes a light path through which laser light passes. The optical unit 1 includes, for example, a laser 11 serving as an external-resonance laser, a half-wavelength plate 12, a polarization beam splitter 13, a half-wavelength plate 14, a polarization beam splitter 15, a phase delay element 16, a beam expander 17, a biaxially-turning mirror 18, a polarization beam splitter 21, an objective lens 22, a mirror 23, a rotary mirror 24, a lens 25, a lens 26, and a CMOS sensor 27.

An operation of the optical unit 1 during reproducing is described below. Laser light emitted from the laser 11 is S waves, for example. The laser light passes through the half-wavelength plate 12, so that the polarization direction thereof is changed by $\pi/4$ (radian), and then laser light enters the polarization beam splitter 13. The polarization beam splitter 13 splits the laser light into S waves traveling toward the mirror 23 and P waves traveling toward the half-wavelength plate 14. When the polarization direction is changed by $\pi/4$ by the half-wavelength plate 12 as described above, the ratio between S waves and P waves is 1:1.

The S waves traveling toward the mirror 23 pass through optical devices constituting an optical path and finally function as reference light (hereinafter referred to as first reference light) that is used for reproducing the information recorded on the hologram recording medium 30 and that is also used in related arts. On the other hand, the P waves traveling toward the half-wavelength plate 14 pass through optical devices constituting another optical path and function as reference light (hereinafter referred to as second reference light) to add a DC component during reproducing.

The S waves traveling toward the mirror 23 enter the hologram recording medium 30 from its one of surfaces via the following light path. That is, the laser light reflected by the mirror 23 is reflected by the rotary mirror 24, passes through the lenses 25 and 26, and then enters the hologram recording medium 30. By changing the orientation of the rotary mirror 24, an incident angle with respect to the hologram recording medium 30 can be changed.

Also, by turning the rotary mirror 24 by a rotary mirror control system (not shown), the incident angle of the first reference light with respect to the hologram recording medium 30 can be changed. At this time, an incident position is constant.

Then, the hologram recording medium 30 is irradiated with the first reference light that has passed through the lens 26, so that diffracted light is generated. The diffracted light is emitted from the other surface of the hologram recording medium 30, becomes parallel light due to the objective lens 22, is bended in a right-angle direction by the polarization beam splitter 21, and is applied onto a light receiving surface of the CMOS sensor 27.

On the other hand, the P waves traveling toward the half-wavelength plate 14 pass through the half-wavelength plate 14. At this time, the half-wavelength plate 14 is turned in advance by predetermined angles with respect to the polarization beam splitter 15, with the light axis of the laser light being the center. Accordingly, the amount of light that can be obtained from the polarization beam splitter 15 is adjusted, and the laser light obtained from the polarization beam splitter 15 is S waves. The S waves from the polarization beam splitter 15 pass through the phase delay element 16. Furthermore, the diameter of the laser light is increased by the beam expander 17. Then, the laser light is reflected by the biaxially-turning mirror 18, passes through the polarization beam splitter 21, and is applied as second reference light onto the light receiving surface of the CMOS sensor 27.

The above-described diffracted light and second reference light are combined on the light receiving surface of the CMOS sensor 27. Accordingly, modulation in phase is converted to modulation in contrast, so that a real image having the contrast is formed on the light receiving surface of the CMOS sensor 27. Note that the second reference light is expanded in its diameter by the beam expander 17 and completely covers the diffracted light on the CMOS sensor 27.

Now, a role of the polarization beam splitter 21 in addition of the diffracted light and the second reference light performed in the CMOS sensor 27 is described.

The first reference light to obtain diffracted light is S waves, as described above. Thus, the second reference light needs to be S waves in order to realize interference of the second reference light and the diffracted light. However, if the second reference light is S waves, the second reference light is reflected by the polarization beam splitter 21 and does not reach the CMOS sensor 27. Thus, the polarization beam splitter 21 is designed so that 99% of S waves is reflected thereby and that 1% of S waves passes therethrough. With this configuration, 1% of the second reference light passes through the polarization beam splitter 21 and is applied onto the CMOS sensor 27. The amount of the second reference light is significantly decreased, and the diffracted light is also significantly decreased to about 0.1% of the amount of the first reference light. Thus, the relative amounts of the second reference light and the diffracted light are appropriate to restore a DC component through addition.

An experiment performed by the inventors of the present application has verified that a DC component can be favorably reproduced if the amplitude of the second reference light is larger than that of the diffracted light on the CMOS sensor 27. Here, the square of amplitude is equal to the amount of light. On the other hand, the amount of light defining the upper limit of the second reference light is an amount of light in which signal outputs from respective pixels of the CMOS sensor 27 are saturated and brightness information is not detected from the respective pixels. The half-wavelength plate 14 is adjusted in advance by being rotated so that the above-described conditions are satisfied.

Next, precision of phase adjustment between the diffracted light and the second reference light that are combined on the entire light receiving surface of the CMOS sensor 27 is described.

Irradiation of a hologram formed as a diffraction grating on the hologram recording medium 30 with the first reference light causes generation of diffracted light. The phase difference between the diffracted light generated by the hologram recording medium 30 and the second reference light is determined. That is, in a state where the hologram recording medium 30 exists in FIG. 1, an image of appropriate contrast can be reproduced only if the phase of the diffracted light from the hologram recording medium 30 and the phase of the second reference light have a predetermined phase difference in each of the pixels of the CMOS sensor 27.

Now, discussion is made below about the phase difference between the diffracted light and the second reference light. The diffracted light is generated based on the first reference light. There exist some optical devices that are not shared by the first reference light or the diffracted light and the second reference light. In other words, there exist some optical devices through which only one of the first reference light or the diffracted light and the second reference light passes. The optical devices through which only the first reference light passes are the rotary mirror 24 and the lenses 25 and 26. The optical device through which the diffracted light generated from the hologram recording medium 30 passes is the objective lens 22. On the other hand, the optical devices through which only the second reference light passes are the half-wavelength plate 14, the polarization beam splitter 15, the phase delay element 16, the beam expander 17, and the biaxially-turning mirror 18.

That is, the first reference light or the diffracted light and the second reference light need to maintain a predetermined phase difference in each of the pixels of the CMOS sensor 27 while passing through different light paths. The predetermined phase difference should ideally be 0 in order to reproduce an appropriate DC component. However, according to the result of the experiment performed by the inventors of the present application, a reproducing characteristic does not significantly degrade if the phase difference is within the range of $\pm\pi/5$ (radian). Thus, the phase difference should desirably be in this range.

For example, if a blue laser generating blue laser light having a wavelength of around 405 nm is used as the laser 11, a phase difference of $\pi/5$ corresponds to 40.5 nm, which is one-tenth of the wavelength. This precision includes a relative error. Thus, by adjusting the phase of the second reference light on the plane vertical to the traveling direction of the laser light with reference to the diffracted light, the desired phase difference within the range of $\pm\pi/5$ can be achieved.

The phase of the second reference light, that is, the length of the light path, is adjusted by using the phase delay element 16 and the biaxially-turning mirror 18. The phase delay element 16 is used to generate uniform phase delay on the plane vertical to the traveling direction of the laser light, that is, to equivalently increase the length of the light path. In the first embodiment, a liquid crystal phase delay element is used as the phase delay element 16. The liquid crystal phase delay element has a sandwich construction in which liquid crystal is sandwiched by two transparent electrode plates. Uniform phase delay is generated in the traveling direction of the laser light in accordance with a voltage applied between the two electrodes, so that the phase in cross section of the laser light is uniformly delayed.

The biaxially-turning mirror 18 changes the phases of two axis directions orthogonal to each other in a cross-sectional direction of the second reference light so as to adjust local phases of the second reference light applied to the CMOS sensor 27 in units of pixels. That is, the biaxially-turning mirror 18 adjusts individual phases independently in directions of the two coordinate axes (hereinafter referred to as two axes) orthogonal to each other in the light receiving surface of the CMOS sensor 27, so as to control the phase difference between the diffracted light and the second reference light within the range of $\pm\pi/5$ on the entire light receiving surface of the CMOS sensor 27.

Figure 2:
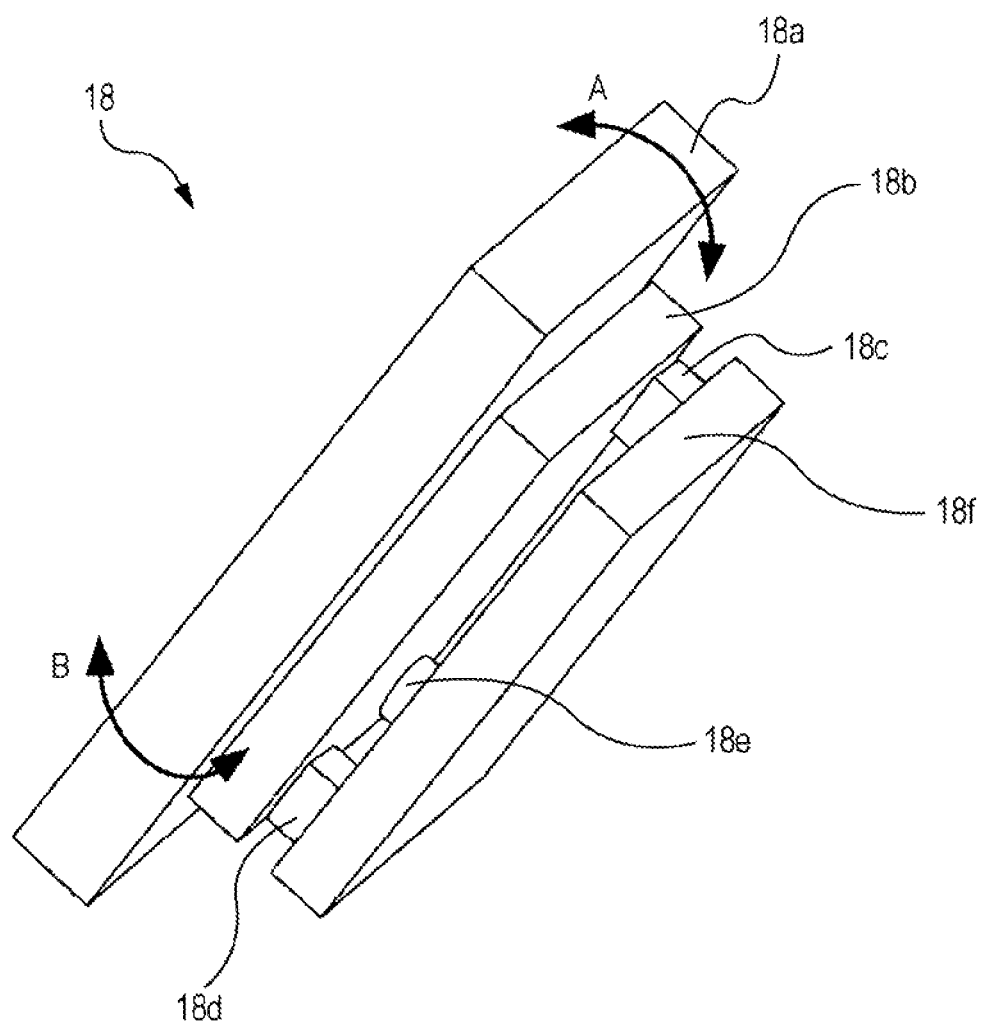
FIG. 2 schematically illustrates a configuration of a biaxially-turning mirror.

FIG. 2 schematically illustrates a configuration of the biaxially-turning mirror 18. As described above, the biaxially-turning mirror 18 has a function of adjusting the length of the light path from the surface of a mirror 18a of the biaxially-turning mirror 18 to the CMOS sensor 27 of the second reference light reflected by the biaxially-turning mirror 18 in directions of the two axes orthogonal to each other of the CMOS sensor 27, so as to adjust local phases of the second reference light applied to the CMOS sensor 27. For this function, the biaxially-turning mirror 18 includes the mirror 18a, a mirror fixing member 18b, a piezo element 18c, a piezo element 18d, a supporting point 18e, and a fixed-side member 18f.

The fixed-side member 18f is fixed onto a reference surface of the optical unit 1 illustrate in FIG. 1. The mirror fixing member 18b is made of a highly-rigid material having no flexibility, and the mirror 18a is bonded to the mirror fixing member 18b. With this configuration, the piezo element 18c expands and contracts in accordance with an applied voltage, so that the mirror 18a turns in the direction indicated by arrow A with the supporting point 18e being the center of the turn. Also, the piezo element 18d expands and contracts in accordance with an applied voltage, so that the mirror 18a turns in the direction indicated by arrow B with the supporting point 18e being the center of the turn.

Now, assume that an intersection point of the surface of the mirror 18a and a perpendicular extending from the supporting point 18e to the surface of the mirror 18a is an origin. As a result of the turn in the direction indicated by arrow A, the length of the light path from the surface of the mirror 18a to the light receiving surface of the CMOS sensor 27 is changed in proportion to the distance from the origin in the line connecting the origin to an intersection point of the surface of the mirror 18a and a perpendicular extending from the piezo element 18c to the surface of the mirror 18a. Here, a positional relationship between the piezo element 18c and a corner portion Dc (see FIG. 3) of the light receiving surface of the CMOS sensor 27 is predetermined so that a light beam reflected at the origin on the surface of the mirror 18a reaches a corner portion Cc of the light receiving surface of the CMOS sensor 27 schematically illustrated in FIG. 3 and that a light beam reflected at the intersection point of the surface of the mirror 18a and the perpendicular extending from the piezo element 18c to the surface of the mirror 18a reaches the corner portion Dc of the light receiving surface of the CMOS sensor 27. That is, expansion and contraction of the piezo element 18c enable change in phase in one of the two axes (first axis) orthogonal to each other in the light receiving surface.

Also, as a result of the turn in the direction indicated by arrow B, the length of the light path from the surface of the mirror 18a to the light receiving surface of the CMOS sensor 27 is changed in proportion to the distance from the above-described origin on the surface of the mirror 18a in the line connecting the origin to an intersection point of the surface of the mirror 18a and a perpendicular extending from the piezo element 18d to the surface of the mirror 18a. Here, a positional relationship between the piezo element 18d and a corner portion Ec (see FIG. 3) of the light receiving surface of the CMOS sensor 27 is predetermined so that a light beam reflected at the intersection point of the surface of the mirror 18a and the perpendicular extending from the piezo element 18d to the surface of the mirror 18a reaches the corner portion Ec of the light receiving surface of the CMOS sensor 27 illustrated in FIG. 3. In this embodiment, one coordinate axis connecting the supporting point 18e and the piezo element 18c is orthogonal to the other coordinate axis connecting the supporting point 18e and the piezo element 18d. Also, in the CMOS sensor 27, the coordinate axis connecting the corner portion Cc and the corner portion Dc is orthogonal to the coordinate axis connecting the corner portion Cc and the corner portion Ec. Expansion and contraction of the piezo element 18c enable change in phase in the other of the two axes (second axis) orthogonal to each other in the light receiving surface.

Hereinafter, adjustment of the phases of the diffracted light and the second reference light by controlling the phase delay element 16 and the biaxially-turning mirror 18 is described with reference to FIGS. 3 to 9.

Figure 3:
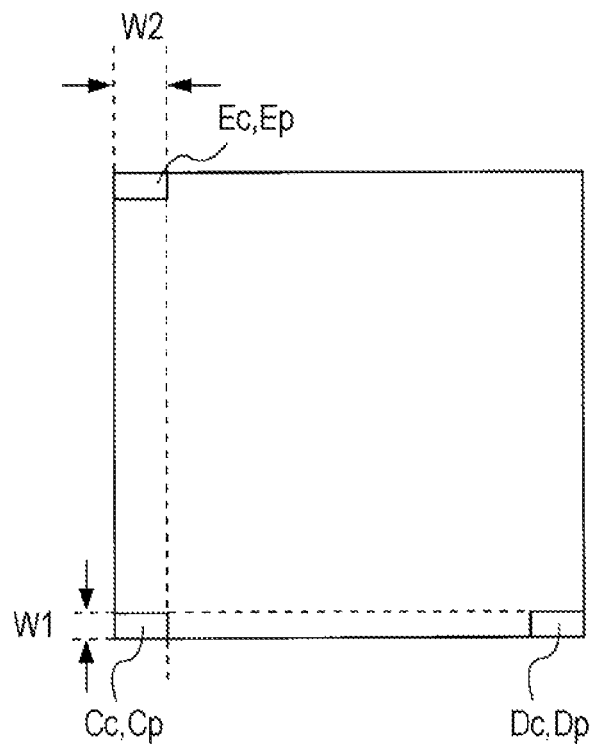
FIG. 3 schematically illustrates a light receiving surface of a CMOS sensor.

FIG. 3 schematically illustrates the light receiving surface of the CMOS sensor 27 and also illustrates a light modulating surface of a spatial modulator in a hologram recording apparatus (not shown). As in the CMOS sensor 27, hundreds of thousands of pixels are placed on the surface of the spatial modulator illustrated in FIG. 3, but the pixels are not shown. On the light modulating surface of the spatial modulator illustrated in FIG. 3, reference symbols Cp, Dp, and Ep are given to indicate the positions of the respective corner portions, in order to distinguish them from the corner portions of the CMOS sensor 27 provided with pixels for generating control signals used in a control system (described below).

Figure 4:
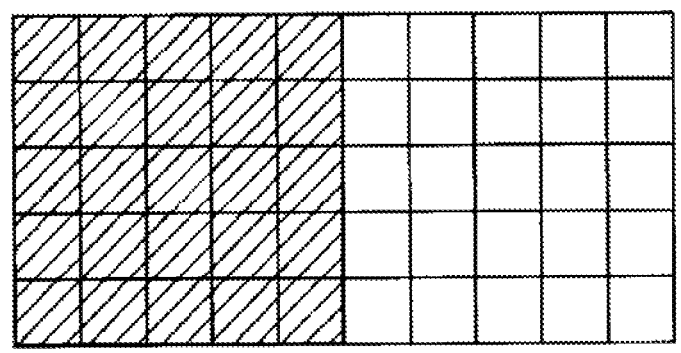
FIG. 4 is an enlarged view of a corner portion of a spatial modulator (not shown)

FIG. 4 is an enlarged view of each of the corner portions Cp, Dp, and Ep of the spatial modulator (not shown). Each corner portion includes two pixel groups each having 5×5=25 pixels. In FIG. 4, the pixels in a diagonally shaded area have a phase of $-\pi/2$, whereas the pixels in a white area have a phase of $+\pi/2$. Assuming that a corner of the corner portion Cp is an origin, the diagonally shaded area is nearer to the origin. The spatial modulator used here is capable of modulating phases for the respective pixels. The hologram reproducing technique according to this embodiment is based on the assumption that information has already been recorded on the hologram recording medium 30 by using the spatial modulator having such a configuration. In the following description, the configuration of this spatial modulator is cited as necessary.

Figure 5:
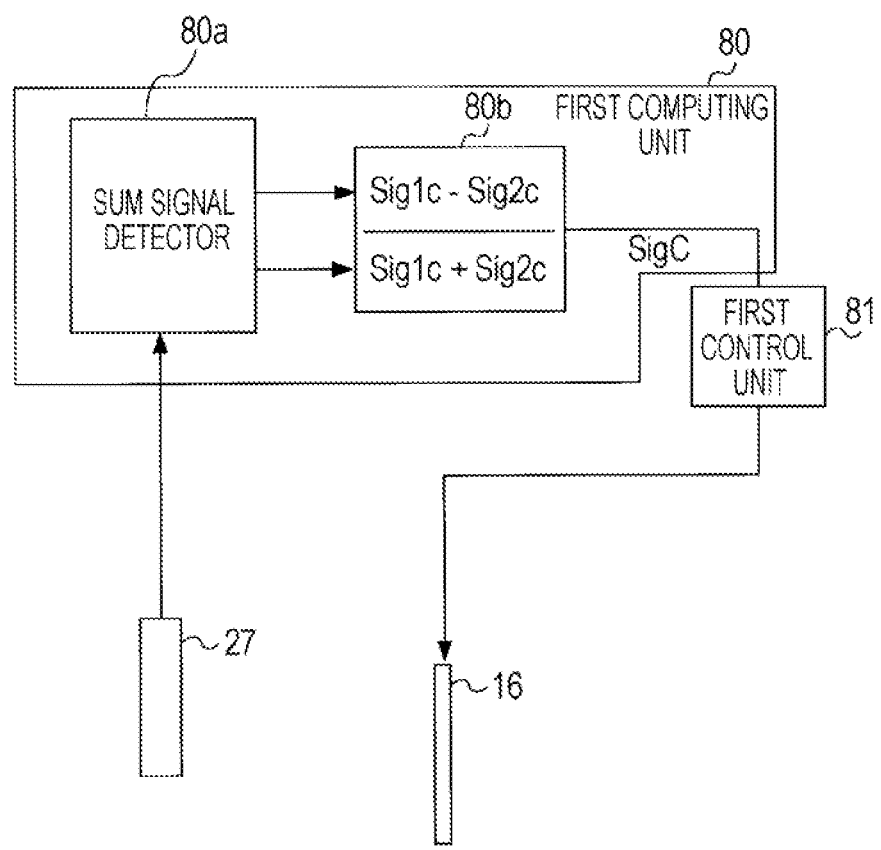
FIG. 5 is a block diagram of a control system to control a phase delay element.

FIG. 5 is a block diagram of a control system to control the phase delay element 16. Here, controlling the phase delay element 16 corresponds to phase adjustment between the diffracted light and the second reference light in the corner portion Cc of the CMOS sensor 27. The control system illustrated in FIG. 5 includes a first computing unit 80 and a first control unit 81. The first computing unit 80 receives signals from the pixels of the corner portion Cc of the CMOS sensor 27. A sum signal detector 80a detects signals Sig1c and Sig2c from the corner portion Cc. The operation of each part of FIG. 5 is described in detail below.

Figure 6:
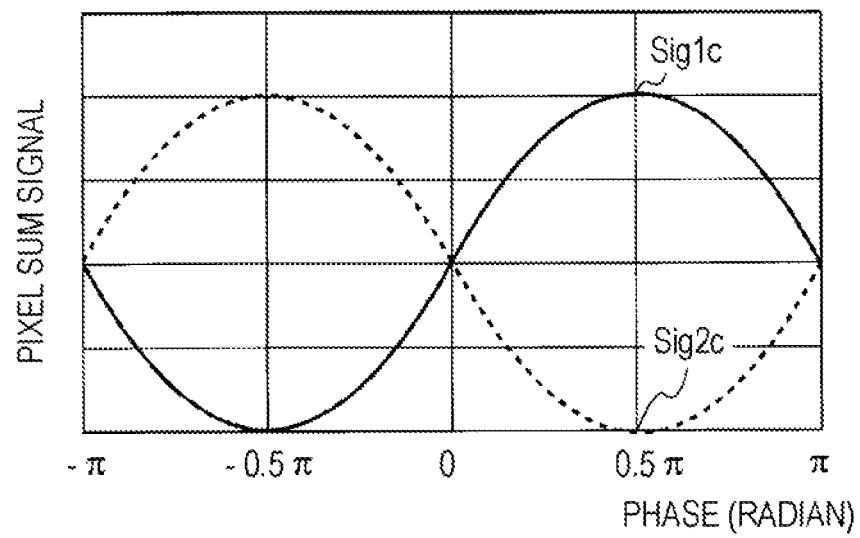
FIG. 6 illustrates characteristics of signals Sig1c and Sig2c.

FIG. 6 illustrates characteristics of the signals Sig1c and Sig2c. Each of the signals Sig1c and Sig2c is a pixel sum signal generated by adding signals output from the pixels in the corner portion Cc. That is, in a case where a hologram recorded on the hologram recording medium 30 is reproduced by the optical unit 1 illustrated in FIG. 1 by using the spatial modulator having the configuration illustrated in FIG.

4, an image corresponding to the form of the corner portion Cp of the spatial modulator can be obtained in the corner portion Cc of the CMOS sensor 27. The signals Sig1c and Sig2c are detected from the corner portion Cc.

Also, each of signals Sig1d and Sig2d described below is a pixel sum signal generated by adding signals output from the pixels of the corner portion Dc, and each of signals Sig1e and Sig2e is a pixel sum signal generated by adding signals output from the pixels of the corner portion Ec. That is, in a case where a hologram recorded on the hologram recording medium 30 is reproduced in the optical unit 1 illustrated in FIG. 1 by using the spatial modulator having the configuration illustrated in FIG. 4, images corresponding to the forms of the corner portions Dp and Ep of the spatial modulator can be obtained in the corner portions Dc and Ec of the CMOS sensor 27.

When the form of modulation formed in the above-described spatial modulator is compared with the form of an image on the light receiving surface of the CMOS sensor formed by the diffracted light generated in the above-described manner from a hologram recorded on the hologram recording medium 30, a form of an image of the corner portion Cc of the CMOS sensor 27 can be obtained in accordance with the form of the corner portion Cp, a form of an image of the corner portion Dc of the CMOS sensor 27 can be obtained in accordance with the form of the corner portion Dp, and a form of an image of the corner portion Ec of the CMOS sensor 27 can be obtained in accordance with the form of the corner portion Ep.

Now, an operation performed in the first computing unit 80 is described with reference to FIG. 6. In FIG. 6, the horizontal axis indicates the phase difference between the diffracted light and the second reference light, whereas the vertical axis indicates signals from the pixels of the corner portion Cc of the CMOS sensor 27 corresponding to the pixels in the diagonally shaded area and the white area of the spatial modulator. The pixels of the corner portion Cc is divided into two groups, as the pixels of the spatial modulator illustrated in FIG. 4. The dividing direction matches the direction of each of the above-described two coordinate axes orthogonal to each other. The signal Sig1c, indicated by a solid line, is obtained from the pixels in a first area of the corner portion Cc of the CMOS sensor 27, which is an area corresponding to the diagonally shaded area of the corner portion Cp of the spatial modulator illustrated in FIG. 4. More specifically, the signal Sig1c is a pixel sum signal generated by adding output signals from the central 3×3=9 pixels. In the signal Sig1c indicated by the solid line, when the phases of both the diffracted light and the second reference light shift by $\pi/2$, the phase difference therebetween is 0, which corresponds to "light" on the CMOS sensor 27 (corresponds to the top of the solid line).

On the other hand, the signal Sig2c, indicated by a broken line, is obtained from the pixels in a second area of the corner portion Cc of the CMOS sensor 27, which is an area corresponding to the white area of the corner portion Cp of the spatial modulator illustrated in FIG. 4. More specifically, the signal Sig2c is a pixel sum signal generated by adding output signals from the central 3×3=9 pixels. When the phases of both the diffracted light and the second reference light shift by $-\pi/2$, the phase difference therebetween is $\pi$, which corresponds to "dark" on the CMOS sensor 27 (corresponds to the bottom in the vertical axis). In this graph, a phase of $2\pi$ is one cycle. The sum signal detected from the center (3×3 pixels) of the pixels in the first group of the corner portion Cc of the CMOS sensor 27 is regarded as the signal Sig1c, and the sum signal detected from the center (3×3 pixels) of the pixels in the second group is regarded as the signal Sig2c. Under this condition, a signal SigC is generated in accordance with expression (1). Here, the signals Sig1c and Sig2c are sum signals obtained from the corner portion Cc.

$$\text{Signal SigC}=(\text{Sig1}c-\text{Sig2}c)/(\text{Sig1}c+\text{Sig2}c) \tag{1}$$

Figure 7:
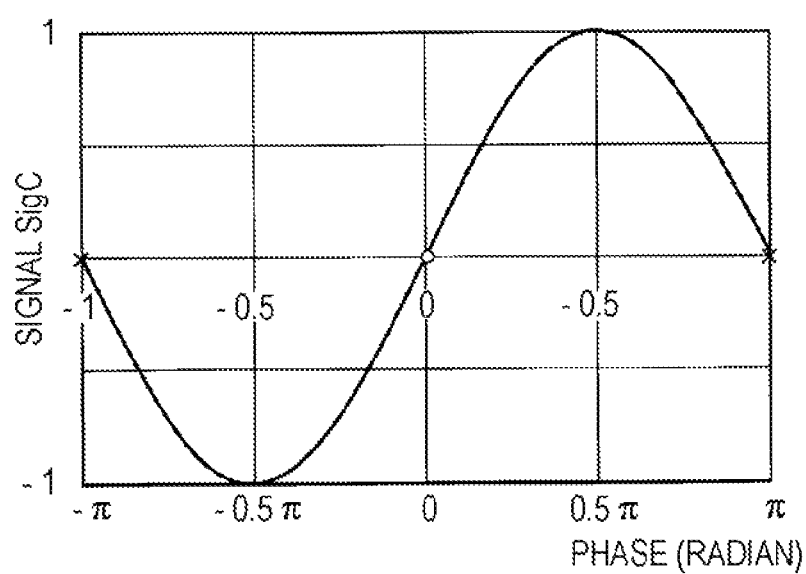
FIG. 7 illustrates a phase difference between diffracted light and second reference light in the horizontal axis and a signal SigC in the vertical axis.

Referring to FIG. 7, the horizontal axis indicates the phase difference between the diffracted light and the second reference light, and the vertical axis indicates a calculation result of expression (1). The signal SigC is normalized, and thus the amplitude indicated in the vertical axis is +1. When the value of the signal SigC is 0 and when the right direction on the horizontal axis is the positive direction on the vertical axis (upward-sloping curve), the phase difference between the diffracted light and the second reference light is 0. The signal SigC may be 0 also in a downward-sloping curve, but this occurs when the phases of the diagonally shaded area and the white area illustrated in FIG. 4 have a difference of $\pi$. This means that the phases of the diffracted light and the second reference light have a difference of $\pi$ (or 1, 3, 5, ... times of wavelength/2) between the two groups of pixels, The two types of 0 are different from each other, and are dealt with as different things. In this embodiment, it is determined that the phases correctly match only in a case of upward-sloping curve.

In the control system illustrated in FIG. 5 and the control system illustrated in FIG. 7, the phase delay element 16 or the biaxially-turning mirror 18 is controlled so that the signal SigC becomes 0, that is, the phase difference between the diffracted light and the second reference light becomes 0 when a control loop is closed. The points where the signal SigC becomes 0 are the following three points: the point where the phase difference is 0; the point where the phase difference is $-\pi$; and the point where the phase difference is $\pi$, as illustrated in FIG. 7. The points where the phase differences are $-\pi$ and $\pi$ have the same properties. The properties of the points where the signal SigC is 0 can be determined by determining whether the value of the signal SigC increases or decreases in the increase direction of the phase difference near 0 of the signal SigC. Even when the signal SigC is 0, a state is not maintained at an unstable equilibrium point. The control system maintains its operation at a stable equilibrium point. In this case, a control operation is maintained with the point where the phase difference is 0 being the stable equilibrium point.

As in expression (1), a signal SigD (described below) can be obtained from the pixels of the corner portion Dc of the CMOS sensor 27, and a signal SigE can be obtained from the pixels of the corner portion Ec of the CMOS sensor 27. Here, the signal SigC varies in accordance with the position of the supporting point 18e of the biaxially-turning mirror 18, the signal SigD varies in accordance with the control position of the piezo element 18c of the biaxially-turning mirror 18, and the signal SigE varies in accordance with the control position of the piezo element 18d of the biaxially-turning mirror 18.

FIG. 5 is a block diagram of the control system to control the phase delay element 16. The sum signal detector 80a receives signals from the CMOS sensor 27 and outputs the signals Sig1c and Sig2c. A normalizer 80b receives the signals Sig1c and Sig2c and outputs the signal SigC. The first control unit 81 receives the signal SigC, adjusts a voltage to be applied to the phase delay element 16, and controls the phase of the second reference light in the phase delay element 16. Then, setting is made so that the voltage to be applied to the phase delay element 16 is kept in this state. Accordingly, in the corner portion Cc of the CMOS sensor 27, the phases of the diffracted light and the second reference light are appropriately adjusted within the predetermined phase difference.

Figure 8:
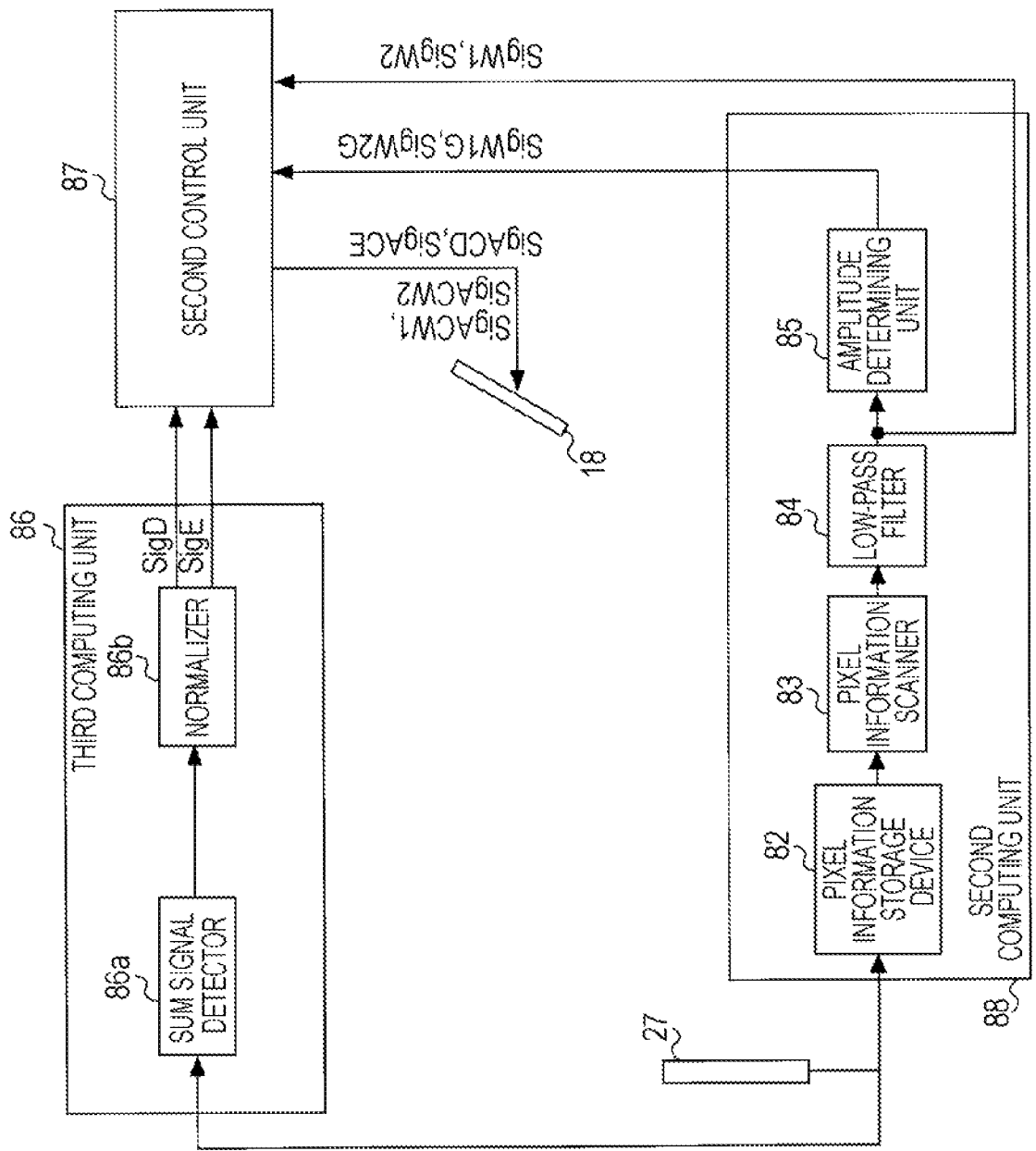
FIG. 8 is a block diagram of a control system to control the biaxially-turning mirror.

FIG. 8 is a block diagram of a control system to control the biaxially-turning mirror 18. A configuration of the control system to control the biaxially-turning mirror 18 and a control method are described with reference to FIG. 8. Controlling the biaxially-turning mirror 18 corresponds to phase adjustment between the diffracted light and the second reference light in the corner portions Dc and Ec of the CMOS sensor 27.

The control system to control the biaxially-turning mirror 18 illustrated in FIG. 8 includes two control systems. One of the control systems performs control based on signals SigW1 and SigW2 detected from a second computing unit 88, and the other control system performs control based on signals SigD and SigE detected from a third computing unit 86. Each of the control systems serves as a feedback control system. A second control unit 87 receives the signals SigW1, SigW2, SigD, and SigE, and processes those signals based on an operation rule. Also, the second control unit 87 has a function of a driver to output signals SigACW1, SigACW2, SigACD, and SigACE to drive the biaxially-turning mirror 18. The signal SigACW1 is a driving signal generated based on the signal SigW1. The signal SigACW2 is a driving signal generated based on the signal SigW2. The signal SigACD is a driving signal generated based on the signal SigD. The signal SigACE is a driving signal generated based on the signal SigE.

The second computing unit 88 includes a pixel information storage device 82, a pixel information scanner 83, a low-pass filter 84, and an amplitude determining unit 85. The third computing unit 86 includes a sum signal detector 86a and a normalizer 86b. The third computing unit 86 has the same configuration as that of the first computing unit 80.

Hereinafter, phase adjustment between the diffracted light and the second reference light in the corner portion Dc of the CMOS sensor 27 is described. Phase adjustment between the diffracted light and the second reference light is performed by two loops: a loop using the signal SigW1 detected from the second computing unit 88; and a loop using the signal SigW2 detected from the third computing unit 86.

Control by the loop using the signal SigW1 detected from the second computing unit 88 is described. Along a line connecting the corner portion Cc to the corner portion Dc of the CMOS sensor 27, pixels over a predetermined width W1 of the CMOS sensor 27 are set as adjusting pixels. In the pixels over the predetermined width W1 extending in this axis (first axis) direction, light and dark stripes occur in the first axis direction. After phase adjustment between the diffracted light and the second reference light has been done in the first axis direction, the light and dark stripes disappear. As the number of light and dark stripes in the first axis direction is larger, the difference in length of the light paths of the diffracted light and the second reference light is larger.

Since the mirror 18a is bonded to the highly-rigid mirror fixing member 18b, a mirror surface connecting the corner portion Cc to the corner portion Dc of the CMOS sensor 27 can be regarded as a straight line. As a result, the light path of the second reference light from the mirror 18a to the light receiving surface of the CMOS sensor 27 monotonously increases as the distance from the origin becomes longer along the first axis. Therefore, if the number of spatial repetitions of change in value of the sum signal from the pixels over the predetermined width W1 (in FIG. 3, pixels placed in the vertical direction of paper) is within 1, that is, if the number of repetitions of light and dark in the first axis direction is within 1, the phase difference between the diffracted light and the second reference light is within $2\pi$. If the number of repetitions of change in value of the sum signal is n, the phase difference between the diffracted light and the second reference light is $2\pi n$ or more.

That is, if the phase difference is $2\pi n$ or more, that means in-phase and opposite phase are spatially repeated between the diffracted light and the second reference light along the first axis. Thus, a peak of any of light and dark on the first axis, that is, the lightest state or the darkest state, is detected only once. Accordingly, the phase difference between the diffracted light and the second reference light can be controlled in the range of $+\pi$. The reason why the phase difference needs to be in the range of $+\pi$ is related to control in fine adjustment described below. That is, a phase difference in the range of $+\pi$ is a condition to realize the stable equilibrium point illustrated in FIG. 7 with a phase difference of 0. When stability is obtained at a phase difference of 0 in a next cycle due to an effect of noise as the phase difference becomes closer to $+\pi$ or $-\pi$, that is, when the phase difference is approximate to $+\pi$ due to an effect of noise, stability is obtained at a phase difference of $2\pi$, and when the phase difference is approximate to $-\pi$, stability is obtained at a phase difference of $2\pi$. In this case, however, peaks of light and dark occur again, so that a leading direction can be appropriately corrected.

In the control system illustrated in FIG. 8, the number of light and dark stripes is calculated by detecting change of light and dark as a time signal, without measuring the number of light and dark stripes that are spatially distributed. Signals from the respective pixels of the CMOS sensor 27 are once accumulated in the pixel information storage device 82. For example, a random access memory (RAM) is used as the pixel information storage device 82. The pixel information scanner 83 adds the signals from the pixels over the predetermined width W1 (see FIG. 3) orthogonal to the first axis accumulated in the pixel information storage device 82 so as to obtain a sum signal, and outputs the sum signal from the pixels over the predetermined width W1 as a time signal at predetermined time intervals, with the direction of the first axis being a time axis, that is, with the origin of the first axis being time 0.

The pixel information scanner 83 adds the signals from the pixels over a predetermined width W2 (see FIG. 3) placed in the first axis direction accumulated in the pixel information storage device 82 so as to obtain a sum signal of the pixels over the predetermined width W2, and then outputs the sum signal from the pixels over the predetermined width W2 as a time signal at predetermined time intervals, with the origin of the second axis (also the origin of the first axis) being time 0.

By allowing the time signals to pass through the low-pass filter 84, frequency information is converted to amplitude and the number of stripes is calculated. Here, the low-pass filter 84 may be a complete integral filter and may temporally detect 0 frequency (spatially corresponds to a phase difference of 0 between the diffracted light and the second reference light). Alternatively, the low-pass filter 84 may be an incomplete integral filter having certain amplitude under a predetermined frequency. In this case, the time signal is a signal according to the amount of received light and originally contains a DC component although it is approximate to a sine wave. Therefore, when the complete integral filter is used, an effect of the DC component needs to be subtracted in advance.

The above-described process is described below according to a specific procedure. First, phase adjustment in the first axis direction is described. The sum signal from the pixels in the range of the predetermined width W1 is output as the signal SigW1, which is a time function, at predetermined time intervals by using the first axis as a time axis. When the number of light and dark stripes in the first axis direction is large, the frequency of the output signal SigW1 having a sine-wave amplitude change is high. When the number of light and dark stripes in the first axis direction is small, the frequency of the output signal SigW1 is low.

By allowing the signal SigW1 to pass through the low-pass filter 84, information of the frequency is converted to information of amplitude in the signal SigW1. As the frequency is lower, the value of the amplitude of the signal SigW1 is larger. When the low-pass filter 84 is a primary low-pass filter, which is a kind of incomplete integral filter, a smaller phase difference can be detected as a cutoff frequency is set lower. Therefore, in this embodiment, the cutoff frequency of the low-pass filter 84 is set so that a phase difference can be detected in the range of $\pm\pi/2$.

Then, the amplitude determining unit 85 determines whether the peak value of the amplitude of the signal SigW1 having changeable amplitude is higher than a predetermined threshold. If the amplitude is higher than the predetermined threshold, the signal SigW1G is inverted from a low level to a high level. The predetermined threshold is set so that the amplitude of the signal SigW1 passed through the low pass filter 84 exceeds the predetermined threshold when the phase difference corresponds to $\pm\pi/2$ from start to end of scanning.

When the number of light and dark stripes forming an image in the first axis direction of the CMOS sensor 27 or the number of light and dark stripes is within 1, the range of phase difference forming an image in the first axis direction of the CMOS sensor 27 is inversely proportional to the amplitude of the signal SigW1 passed through the low-pass filter 84. Thus, by correcting in advance the number of light and dark stripes or the amplitude of the signal SigW1 passed through the low-pass filter 84 to the range of phase difference, a desired threshold to detect a phase difference in the range of $\pm\pi/2$ based on any light and dark on the first axis can be set.

The second control unit 87 that has received the signals SigW1 and SigW1G controls the piezo element 18c of the biaxially-tuning mirror 18 by using the signal SigACW1 in the following control procedure. The signal SigACW1 is generated based on the signal SigW1.

Diffracted light is obtained through irradiation of the hologram recording medium 30 with the first reference light and the second reference light is applied, so as to obtain interference fringes of the diffracted light and the second reference light on the light receiving surface of the CMOS sensor 27. Then, the signal SigW1G is obtained from the second computing unit 88 in the above-described manner. When the signal SigW1G is in a high level, the second control unit 87 holds the voltage that is being applied to the piezo element 18c at that time.

When the signal SigW1G is in a low level, the second control unit 87 detects the value of the signal SigW1 at that time. Then, the second control unit 87 adds a certain amount of voltage of one of polarities to the voltage presently being applied to the piezo element 18c. After changing the voltage, the second control unit 87 detects the value of the signal SigW1 again and determines whether the value is larger than the value of the signal SigW1 detected previously. If the value is larger, the direction of polarity is appropriate, and thus the second control unit 87 continues to add a voltage of the same polarity. The second control unit 87 stops the operation of adding the voltage at the time when the signal SigW1 changes to a high level, and holds the voltage that is being applied to the piezo element 18c at that time.

After adding the certain voltage of one of the polarities to the voltage presently being applied to the piezo element 18c, the second control unit 87 detects the signal SigW1 again. If the value of the signal SigW1 decreases, the direction of the polarity of the certain amount of voltage to be applied is opposite, so that a voltage of the opposite polarity is added. The second control unit 87 stops the operation of adding the voltage at the time when the signal SigW1 changes to a high level, and holds the voltage that is being applied to the piezo element 18c at that time.

Accordingly, rough adjustment in the first axis direction completes. That is, the phase difference in both ends in the first axis direction of the CMOS sensor 27 can be controlled in the range of $\pm\pi/2$.

The same operation can be applied to rough adjustment in the second axis direction. Hereinafter, phase adjustment in the second axis direction is described. A sum signal from the pixels in the range of the predetermined width W2 in the second axis direction is output at predetermined time intervals so as to obtain the signal SigW2, which is an output sine-wave time signal. Then, the signal SigW2 is allowed to pass through the low-pass filter 84. Accordingly, the signal SigW2 in which information of frequency has been converted to information of amplitude can be obtained. As the frequency is lower, the value of the amplitude of the signal SigW2 is larger. Then, the amplitude determining unit 85 determines whether the peak value of the amplitude of the signal SigW2 is larger than the predetermined threshold. If the amplitude is higher than the predetermined threshold, the signal SigW2D is inverted from a low level to a high level. Accordingly, the phase difference in both ends in the second axis direction of the CMOS sensor 27 can be determined to be in the range of $\pm\pi/2$.

The second control unit 87 controls the piezo element 18d of the biaxially-turning mirror 18 by using the signal SigACW2 in the following control procedure. The signal SigACW2 is generated based on the signal SigW2.

Diffracted light is obtained through irradiation of the hologram recording medium 30 with the first reference light and the second reference light is applied, so as to obtain interference fringes of the diffracted light and the second reference light on the light receiving surface of the CMOS sensor 27. Then, the signal SigW2G is obtained from the second computing unit 88 in the above-described manner. When the signal SigW2G is in a high level, the second control unit 87 holds the voltage that is being applied to the piezo element 18d at that time.

When the signal SigW2G is in a low level, the second control unit 87 detects the value of the signal SigW2G at that time. Then, the second control unit 87 adds a certain amount of voltage of one of polarities to the voltage presently being applied to the piezo element 18d. After changing the voltage, the second control unit 87 detects the value of the signal SigW2G again and determines whether the value is larger than the value of the signal SigW2G detected previously. If the value is larger, the direction of polarity is appropriate, and thus the second control unit 87 continues to add a voltage of the same polarity. The second control unit 87 stops the operation of adding the voltage at the time when the signal SigW2G changes to a high level, and holds the voltage that is being applied to the piezo element 18d at that time.

After adding the certain voltage of one of the polarities to the voltage presently being applied to the piezo element 18d, if the value of the signal SigW2G decreases, the direction of the polarity is opposite, so that a voltage of the opposite polarity is added. The second control unit 87 stops the operation of adding the voltage at the time when the signal SigW2G changes to a high level, and holds the voltage that is being applied to the piezo element 18d at that time.

Accordingly, rough adjustment in the second axis direction completes. Any of the rough adjustment in the first axis direction and the rough adjustment in the second axis direction can be performed first. Alternatively, the rough adjustment in the first axis direction and the rough adjustment in the second axis direction can be performed at the same time by providing two pixel information scanners 83, two low-pass filters 84, and two amplitude determining units 85.

By performing the above-described process, the phase difference between the diffracted light and the second reference light can be controlled within the range of $\pm\pi/2$ both in the first axis direction and the second axis direction.

As described above, the phase difference between the diffracted light and the second reference light needs to be within the range of $\pm\pi/5$ on the entire light receiving surface of the CMOS sensor 27 in order to favorably reproduce a DC component. Thus, the phase difference is finely adjusted to within $\pm\pi/5$ on the entire light receiving surface of the CMOS sensor 27.

The fine adjustment is performed by using the third computing unit 86, the second control unit 87, and the biaxially-turning mirror 18. The normalizer 86b calculates the signal SigD in accordance with expression (2) by using sum signals Sig1d and Sig2d from the sum signal detector, and calculates the signal SigE in accordance with expression (3) by using sum signals Sig1e and Sig2e from the sum signal detector. The signals Sig1d and Sig2d are sum signals obtained from the corner portion Dc, whereas the signals Sig1e and Sig2e are sum signals obtained from the corner portion Ec.

Signal SigD=(Sig1d−Sig2d)/(Sig1d+Sig2d)  (2)

Signal SigE=(Sig1e−Sig2e)/(Sig1e+Sig2e)  (3)

Hereinafter, fine adjustment in the first axis direction and fine adjustment in the second axis direction to control the phase difference between the diffracted light and the second reference light in the range of $\pm\pi/5$ are described.

Each of the signals SigD and SigE has the same property as that of the above-described signal SigC and has a stable equilibrium point and an unstable equilibrium point in the relationship with the polarity direction of driving of the biaxially-turning mirror 18. In this case, each of the signals SigD and SigE has a stable equilibrium point at the same position of the phase difference as that indicated by a circle of the signal SigC illustrated in FIG. 7, in the relationship with the polarity direction of driving of the biaxially-turning mirror 18.

Thus, the control loop for fine adjustment operates in the following manner. That is, in the first axis direction, a signal that is generated by adding the signal SigACD generated based on the signal SigD to the signal SigACW1 generated based on the above-described signal SigW1 is applied to the piezo element 18c of the biaxially-turning mirror 18 so that the signal SigD converges to the stable equilibrium point. In the second axis direction, a signal that is generated by adding the signal SigACE generated based on the signal SigE to the signal SigACW2 generated based on the above-described signal SigW2 is applied to the piezo element 18d of the biaxially-turning mirror 18 so that the signal SigE converges to the stable equilibrium point. As a result, the phase difference between the diffracted light and the second reference light can be controlled within the range of $\pm\pi/5$ on the entire surface of the CMOS sensor 27.

How much a steady-state error, which is a phase difference in the control system in a steady state, can be decreased depends on the gain in a low-frequency band of the control system. On the other hand, the responsiveness of the control system depends on a control band. An optimal design in view of these two points is a usually-adopted design of the control system and is defined by the second control unit 87. By appropriately selecting a low-band gain and obtaining an appropriate control band, the phase difference between the diffracted light and the second reference light can be suppressed in the range of $\pm\pi/5$. For example, the phase difference can be suppressed in the range of $\pm\pi/5$ in a sufficiently shorter time compared to the reproducing time of each page of a hologram.

<Modification of the First Embodiment>

Figure 9:
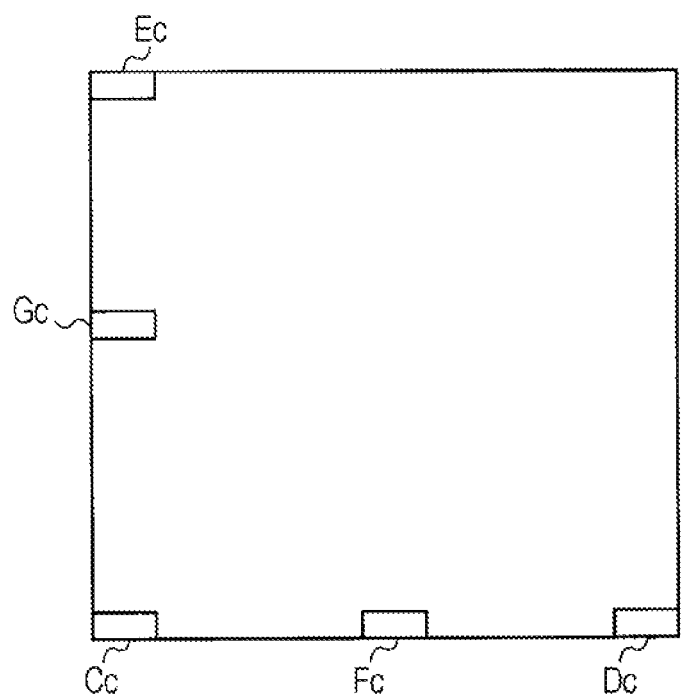
FIG. 9 is a schematic view of a CMOS sensor according to a modification of the first embodiment.

FIG. 9 illustrates a CMOS sensor according to a modification of the first embodiment. An intermediate portion Fc may be provided between the corner portions Cc and Dc of the CMOS sensor 27, a signal SigF may be detected from the intermediate portion Fc in addition to the signal SigD, and the sum of the signals SigD and SigF can be used for control. Accordingly, the S/N (signal-to-noise) ratio of the control signal can be improved and a more favorable control characteristic about the first axis can be obtained. Likewise, an intermediate portion Ge may be provided between the corner portions Cc and Ec of the CMOS sensor 27, a signal SigG may be detected from the intermediate portion Gc in addition to the signal SigD, and the sum of the signals SigE and SigG can be used for control. Accordingly, the S/N ratio of the control signal can be improved and a more favorable control characteristic about the second axis can be obtained. Other than that, a portion where a control signal is to be detected may be placed on an extension of the first axis or the second axis so as to obtain a more favorable S/N ratio of the control signal.

Although not shown, according to the modification of the first embodiment, the beam expander 17 illustrated in FIG. 1 may be placed between the biaxially-turning mirror 18 and the polarization beam splitter 21. In that case, the diameter of a light beam reflected by the biaxially-turning mirror 18 is small, and thus the biaxially-turning mirror 18 can be miniaturized. Accordingly, the response characteristic of the biaxially-turning mirror 18 can be improved and desired control can be performed at high speed and with lower power. When such a configuration is adopted, an incident angle of laser light to the beam expander 17 changes due to the biaxially-turning mirror 18 and aberration occurs. However, this aberration does not cause a problem because a deflection angle of the mirror is usually very small.

<Second Embodiment>

Figure 10:
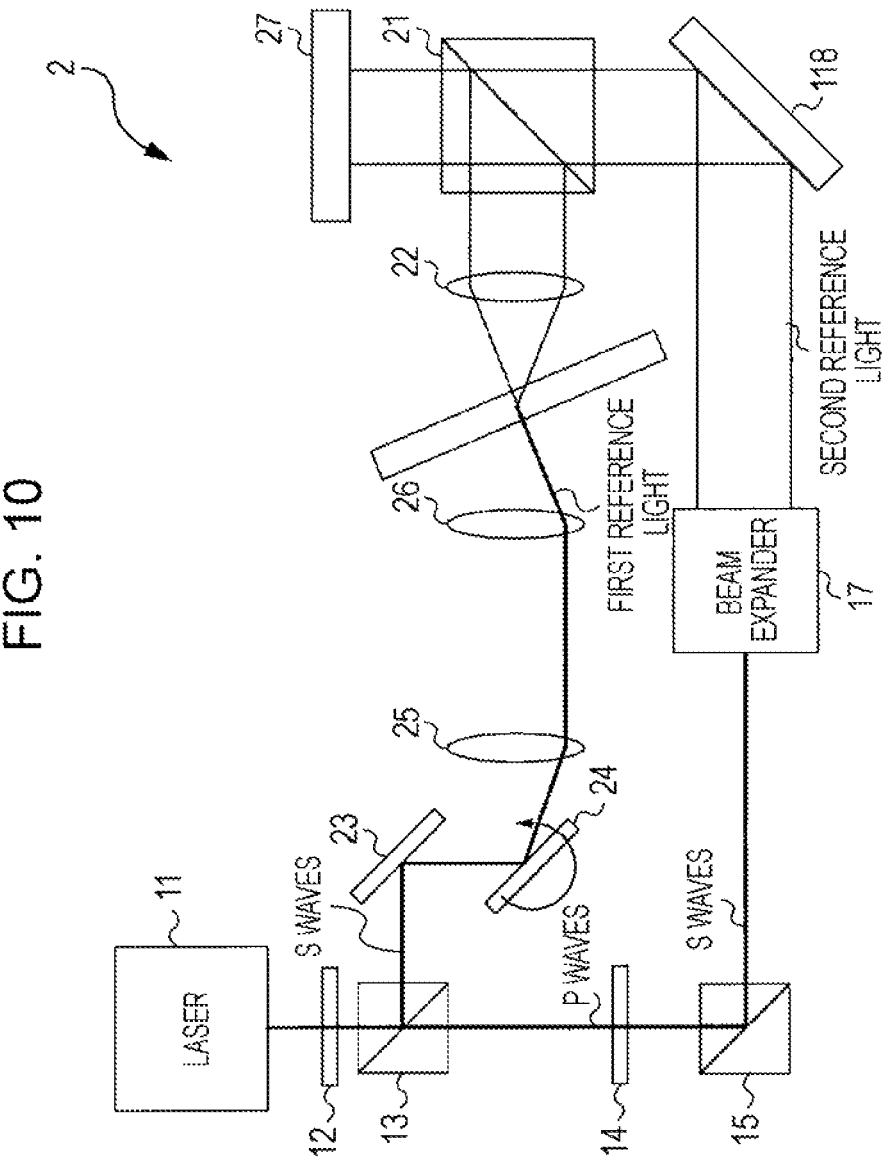
FIG. 10 is a schematic view mainly illustrating an optical unit of a hologram reproducing apparatus according to a second embodiment.

Hereinafter, a second embodiment is described with reference to FIG. 10. FIG. 10 illustrates another optical unit 2 of the hologram reproducing apparatus.

The hologram reproducing apparatus according to the second embodiment adopting the optical unit 2 illustrated in FIG. 10 does not include the phase delay element 16 according to the first embodiment illustrated in FIG. 1. The function of the phase delay element 16 is performed by a biaxially-turning uniaxially-moving mirror 118.

Figure 11:
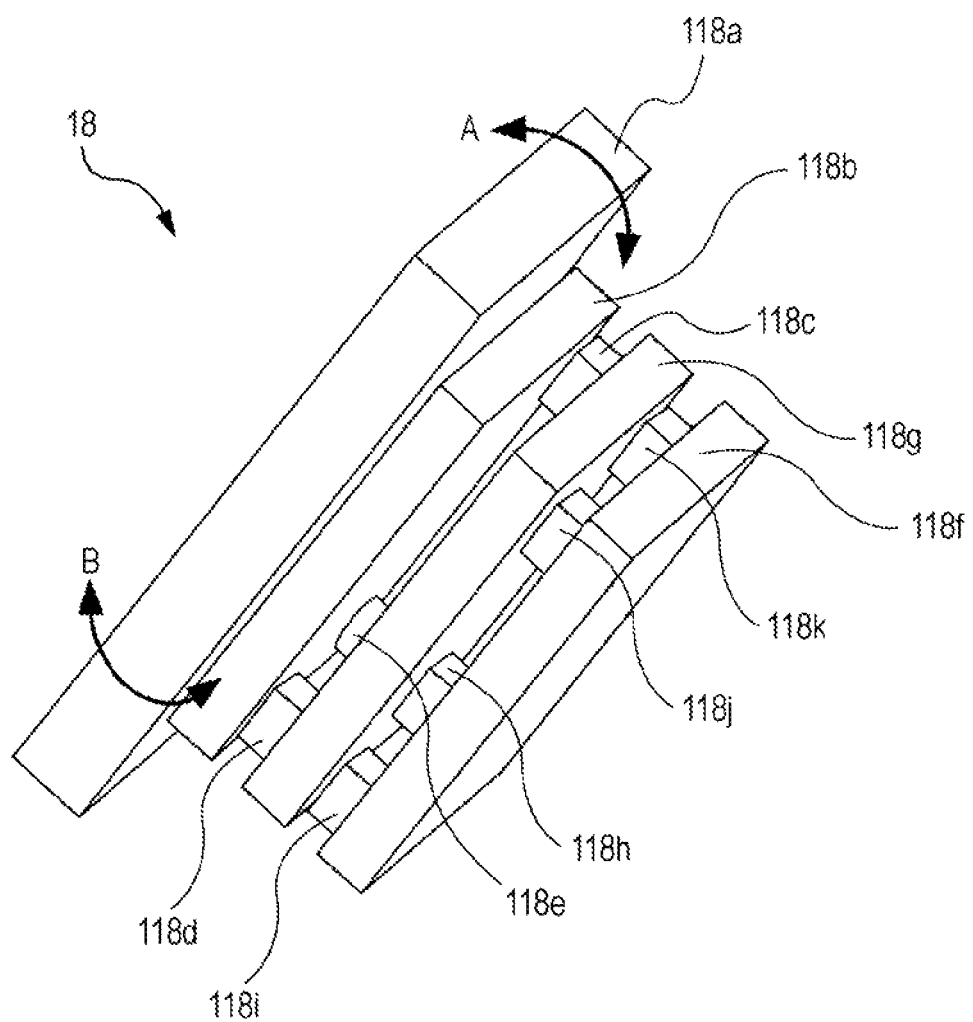
FIG. 11 is a schematic view of a biaxially-turning uniaxially-moving mirror.

FIG. 11 is a schematic view of the biaxially-turning uniaxially-moving mirror 118. As the biaxially-turning mirror 18 according to the first embodiment, the biaxially-turning uniaxially-moving mirror 118 illustrated in FIG. 11 has a function of adjusting the length of a light path of the second reference light reflected by the biaxially-turning uniaxially-moving mirror 118 from the surface of a mirror 118a of the biaxially-turning uniaxially-moving mirror 118 to the CMOS sensor 27 for the two directions orthogonal to each other of the CMOS sensor 27, in order to adjust local phases of the second reference light applied to the CMOS sensor 27. For this function, the biaxially-turning uniaxially-moving mirror 118 includes the mirror 118a, a mirror fixing member 118b, a piezo element 118c, a piezo element 118d, a supporting point 118e, and a moving member 118g instead of the fixed-side member 18f in FIG. 2.

The mirror 118a in FIG. 11 corresponds to the mirror 18a in FIG. 2. The mirror fixing member 118b corresponds to the mirror fixing member 18b. The piezo element 118c corresponds to the piezo element 18c. The piezo element 118d corresponds to the piezo element 18d. The supporting point 118e corresponds to the supporting point 18e. The moving member 118g corresponds to the fixed-side member 18f. The above-described corresponding members have the same configuration and the same function.

In addition to the members included in the biaxially-turning mirror 18 according to the first embodiment, the biaxially-turning uniaxially-moving mirror 118 includes piezo elements 118h, 118i, 118j, and 118k at four corners of the moving member 118g. The piezo elements 118h to 118k are sandwiched between the moving member 118g and a fixed-side member 118f.

The fixed-side member 118f is fixed onto a reference surface of the optical unit 2. In the biaxially-turning uniaxially-moving mirror 118 having the above-described configuration, a voltage is applied to each of the piezo elements 118h to 118k so as to equalize the amount of each movement of the moving member 118g bonded to the piezo elements 118h to 118k of the mirror 118a moved by the piezo elements 118h to 118k. Accordingly, in the mirror 118a, the distances from the fixed-side member 118f and the reference surface of the optical unit 2 are changed over the entire surface of the mirror 118a. Accordingly, the distance between a reflection surface of laser light of the mirror 118a and the light receiving surface of the CMOS sensor 27, that is, the clearance between the reflection surface of laser light of the mirror 118a and the light receiving surface of the CMOS sensor 27, can be uniformly changed over the entire surface.

The biaxially-turning uniaxially-moving mirror 118 is controlled by using the same method as that for the piezo elements 18c and 18d according to the first embodiment for the piezo elements 118c and 118d, and by using the same method as that for controlling the phase delay element 16 according to the first embodiment for the piezo elements 118h to 118k. That is, by replacing the phase delay element 16 in the control system illustrated in FIG. 5 with the piezo elements 118h to 118k, control can be performed in the same manner as in the first embodiment.

<Modification of the Second Embodiment>

A modification (not shown) of the second embodiment is described. In the configuration according to the second embodiment illustrated in FIG. 10, the beam expander 17 may be placed between the biaxially-tuning uniaxially-moving mirror 118 and the polarization beam splitter 21. In that case, the diameter of a light beam reflected by the biaxially-turning uniaxially-moving mirror 118 is small, and thus the biaxially-turning uniaxially-moving mirror 118 can be miniaturized. Accordingly, the response characteristic of the biaxially-turning uniaxially-moving mirror 118 can be improved and desired control can be performed at high speed and with low power.

<Third Embodiment>

Figure 12:
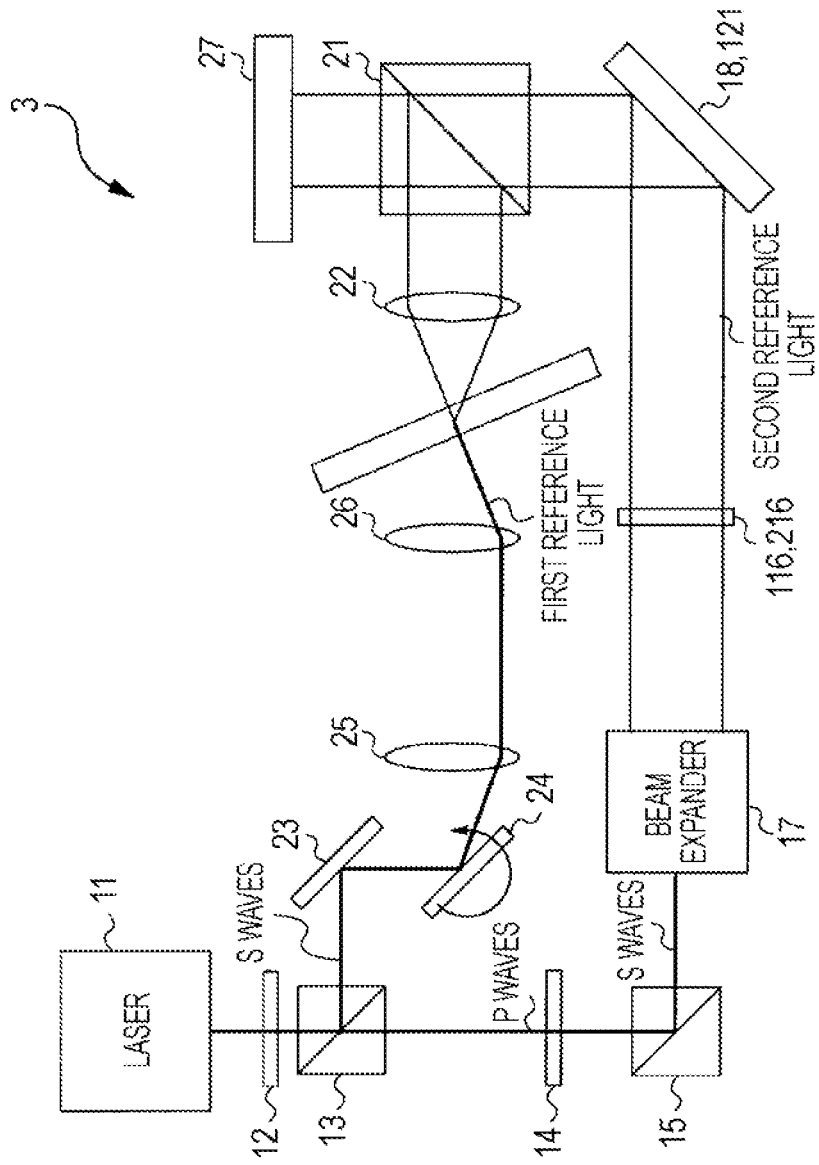
FIG. 12 is a schematic view mainly illustrating an optical unit of a hologram reproducing apparatus according to a third embodiment.

Hereinafter, a third embodiment is described with reference to FIG. 12. FIG. 12 illustrates another optical unit 3 of the hologram reproducing apparatus.

The hologram reproducing apparatus according to the third embodiment including the optical unit 3 illustrated in FIG. 12 does not include the phase delay element 16 according to the first embodiment illustrated in FIG. 1, but includes a phase modulating element 116 or 216 between the beam expander 17 and the biaxially-turning mirror 18 or a fixed mirror 121.

Figure 13A:
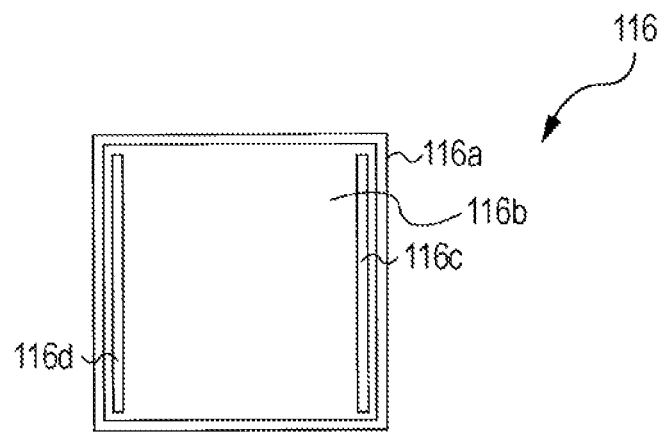
FIGS. 13A to 13C illustrate a configuration of a phase modulating element.
Figure 13B:
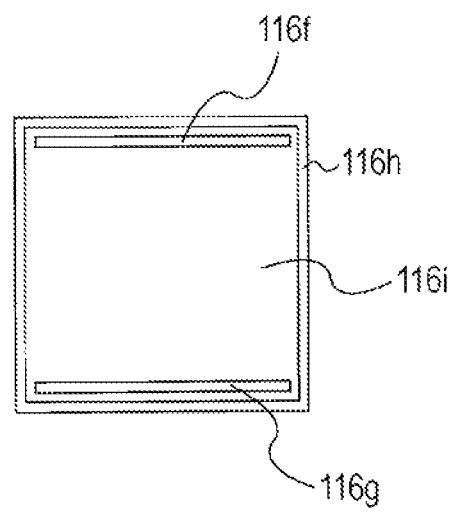
Figure 13C:
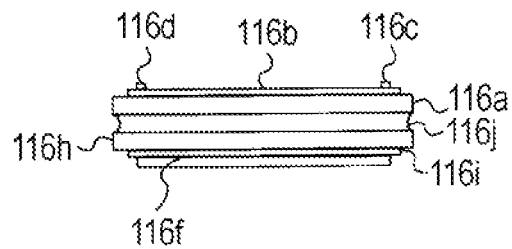

FIGS. 13A to 13C illustrate a configuration of the phase modulating element 116. FIG. 13A illustrates a configuration of one of surfaces (a surface through which the second reference light passes) of the phase modulating element 116. FIG. 13B illustrates a configuration of the other surface of the phase modulating element 116. FIG. 13C illustrates a cross-sectional configuration of the phase modulating element 116. As illustrated in FIG. 13A, on one of the surfaces of the phase modulating element 116, a transparent electrode 116b (first optically-transparent film) is coated on a glass substrate 116a (first rigid plate), and an aluminum electrode 116c (first electrode) and an aluminum electrode 116d (second electrode) are placed on both ends of the transparent electrode 116b.

The transparent electrode 116b is made of a material allowing laser light to pass therethrough and having a relatively high resistance, such as indium tin oxide (ITO), zinc oxide, or tin oxide, and is formed on the glass substrate 116a by spattering or vacuum evaporation.

As illustrated in FIG. 13B, the configuration on the other surface of the phase modulating element 116 includes a glass substrate 116h (second rigid plate), a transparent electrode 116i (second optically-transparent film), an aluminum electrode 116f (third electrode), and an aluminum electrode 116g (fourth electrode), as the configuration illustrated in FIG. 13A. Note that the orientation of the aluminum electrodes 116f and 116g is different by 90 degrees from that of the aluminum electrodes 116c and 116d illustrated in FIG. 13A.

As illustrated in FIG. 13C, liquid crystal 116j is filled between the glass substrates 116a and 116h of the phase modulating element 116, and the configuration thereof is the same as that of the phase delay element 16 in that liquid crystal is filled.

By applying a voltage between the aluminum electrodes 116c and 116d of the phase modulating element 116, voltage gradient occurs between the aluminum electrodes 116c and 116d, so that different voltages occur between the transparent electrodes 116b and 116i in accordance with the distance in the lateral direction of the paper of FIG. 13C. Also, by applying a voltage between the aluminum electrodes 116f and 116g, voltage gradient occurs between the aluminum electrodes 116f and 116g, so that different voltages occur between the transparent electrodes 116b and 116i in accordance with the distance in the front/back direction of the paper of FIG. 13C.

The phase of the second reference light delays in accordance with the different voltages between the transparent electrodes 116b and 116i.

For example, if a voltage of 5 V is applied to the aluminum electrode 116d and if a voltage of 0 V is applied to the aluminum electrode 116c, the voltage in the first axis direction linearly changes from 5 V to 0 V from the aluminum electrode 116d toward the aluminum electrode 116c. If a voltage of −5 V is applied to the aluminum electrode 116f and if a voltage of 0 V is applied to the aluminum electrode 116g, the voltage in the second axis direction linearly changes from −5 V to 0 V from the aluminum electrode 116f toward the aluminum electrode 116g.

As described above, by controlling each of the voltages in the first axis direction and the second axis direction, the phase of the second reference light can be adjusted in each of the first axis direction and the second axis direction of the CMOS sensor 27. In this case, either the fixed mirror 218 or the biaxially-turning mirror 18 may be used as a mirror.

When the fixed mirror 218 is used as a mirror, the signals SigACW1, SigACW2, SigACD, and SigACE detected by the configuration illustrated in FIG. 8 are used in the following manner.

The signal SigACW1 is applied to the aluminum electrode 116d, the signal SigACD is applied to the aluminum electrode 116g, the signal SigACW2 is applied to the aluminum electrode 116f, and the signal SigACE is applied to the aluminum electrode 116g.

By applying the voltage in this manner, the phase difference between the diffracted light and the second reference light can be controlled in the range of ±π/5 by an operation of the control system. Herein, the phase modulating element 116 does not have a mechanically movable portion, and thus the mechanism can be simplified compared to the case where phase adjustment is performed by using the biaxially-turning mirror 18.

When the fixed mirror 218 is not used but the biaxially-turning mirror 18 is used as a mirror, the signal SigACD may be applied to the aluminum electrode 116f, a fixed voltage may be applied to the aluminum electrode 116g, the signal SigACE may be applied to the aluminum electrode 116f, a fixed voltage may be applied to the aluminum electrode 116g, the signal SigW1 may be applied to the piezo element 18c of the biaxially-turning mirror 18, and the signal SigW2 may be applied to the piezo element 18d of the biaxially-turning mirror 18. In that case, a spatial low-frequency component of large amplitude is controlled by the biaxially-turning mirror 18 and a spatial high-frequency component of small amplitude is controlled by the phase modulating element 116, so as to miniaturize the phase modulating element 116.

When the fixed mirror 218 is not used but the biaxially-turning mirror 18 is used as a mirror, another control method can also be used. That is, the signals SigACD and SigACE are divided into high-frequency component signals SigACDh and SigACEh and low-frequency component signals SigACDl and SigACEl, respectively, the signal SigACDh is applied to the aluminum electrode 116f, a fixed voltage is applied to the aluminum electrode 116g, the signal SigACEh is applied to the aluminum electrode 116f, a fixed voltage is applied to the aluminum electrode 116g, a sum voltage of the signals SigW1 and SigACDl is applied to the piezo element 18c of the biaxially-turning mirror 18, and a sum voltage of the signals SigW2 and SigACEl is applied to the piezo element 18d of the biaxially-turning mirror 18. Accordingly, the phase modulating element 116 can be further miniaturized. In FIGS. 13A to 13C, the electrodes on the glass substrate are placed on the opposite side of the liquid crystal. Alternatively, the electrodes may be placed on the same side as the liquid crystal while being covered with an insulating film.

Figure 14A:
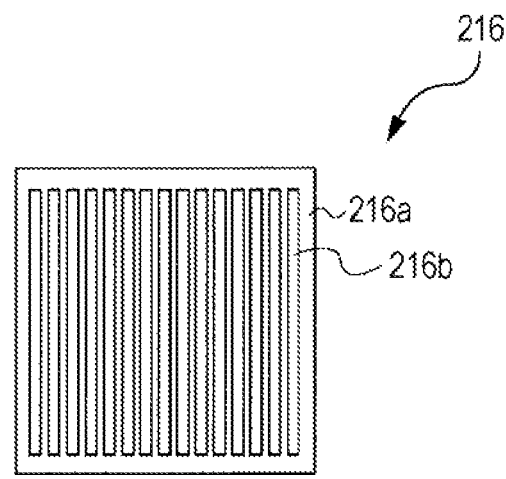
FIGS. 14A to 14C illustrate a configuration of another phase modulating element.
Figure 14B:
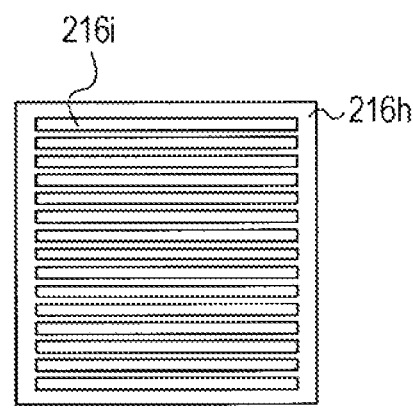
Figure 14C:
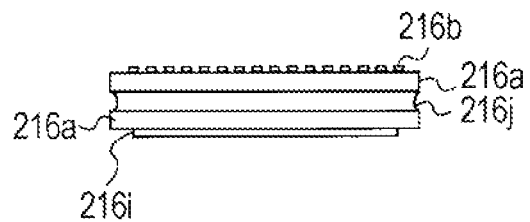

FIGS. 14A to 14C illustrate another phase modulating element 216. The phase modulating element 216 does not include aluminum electrodes, but includes rectangular transparent electrodes, as illustrated in FIGS. 14A and 14B. These transparent electrodes desirably have low resistance so that voltage distribution does not occur in the electrodes. For example, in FIG. 14A, a voltage according to the signal SigW1 is applied to the right-end transparent electrode 216b, one of the plurality of parallel electrodes placed on a glass substrate 216a (first rigid plate), a 0.1 V higher voltage is applied to the next transparent electrode, a 0.2 V higher voltage is applied to the further next transparent electrode, and so on. Accordingly, voltage gradient can be generated. Likewise, in FIG. 14B, a voltage according to the signal SigW1 is applied to the top transparent electrode 216i, one of the plurality of parallel electrodes placed on a glass substrate 216h (second rigid plate), a 0.1 V higher voltage is applied to the next transparent electrode, a 0.2 V higher voltage is applied to the further next transparent electrode, and so on. Accordingly, voltage gradient can be generated. The voltage rises stepwise near the transparent electrodes from right to left or from top to bottom, but the voltage distribution is a round straight line near the liquid crystal. In this case, the width of each transparent electrode is 0.5 mm, and the distance between adjacent transparent electrodes is 100 nm. In FIGS. 14A to 14C, too, the electrodes on the glass substrate are placed on the opposite side of the liquid crystal. Alternatively, the electrodes may be placed on the same side of the liquid crystal while being covered with an insulating film.

A modification common to the above-described first to third embodiments is described below. In the first embodiment, the ratio of the amount of the first reference light and the second reference light generated by the polarization beam splitter 13 is 1:1, and the polarization beam splitter 21 has a reflectance of 99% and a transmittance of 1%. However, these values may be arbitrarily set to some extent. For example, assuming that the polarization beam splitter 21 has a reflectance of 90% and a transmittance of 10% for S waves, diffracted light is lost by 10%. However, the amount of the second reference light in the light receiving element is ten times larger compared to a case where the reflectance is 99% and the transmittance is 1%. Therefore, in order to obtain the same amount of light as that in the case where the reflectance is 99% and the transmittance is 1%, the emission power of the laser 11 is decreased to about half, 55/100, and the half-wavelength plate 12 is set so that the ratio of the amount of the first reference light and the second reference light generated by the polarization beam splitter 13 is 10:1. Accordingly, the same advantage can be obtained even if the emission power from the laser 11 is lower.

In the above-described embodiments, both the first reference light and the second reference light are S waves. Alternatively, the both may be P waves because the polarization direction needs to match only between the first reference light and the second reference light.

<Fourth Embodiment>

Hereinafter, a fourth embodiment is described with reference to FIG. 15. In the fourth embodiment, an optical unit 4 of a hologram recording/reproducing apparatus using a so-called coaxial technique is used. In this embodiment, a hologram recording medium 130 with a reflective film is used as a hologram recording medium.

The optical unit 4 includes, as optical members constituting a light path through which the first reference light passes, a laser 41, an isolator 42, a shutter 43, a Fourier transform lens 44, a Fourier transform lens 45, a half-wavelength plate 46, a polarization beam splitter 47, a movable mirror 51, a polarization beam splitter 52, a phase-modulating-type spatial modulator 53, a pinhole 59, a Fourier transform lens 55, a polarization beam splitter 56, a Fourier transform lens 57, a pinhole 58, a Fourier transform lens 61, a polarization beam splitter 62, a quarter-wavelength plate 63, and an objective lens 70. In FIG. 15, all of the first reference light, the second reference light, and the diffracted light travel in the front/back direction of the paper of FIG. 15. Thus, a prism (not shown) is placed between the quarter-wavelength plate 63 and the objective lens 70, so that the traveling direction of beams of the first reference light and the diffracted light is bended at a right angle.

Also, the optical unit 4 includes, as optical members constituting a light path through which the second reference light passes, the laser 41, the isolator 42, the shutter 43, the Fourier transform lens 44, the Fourier transform lens 45, the half-wavelength plate 46, the polarization beam splitter 47, a mirror 48, a half-wavelength plate 69, a polarization beam splitter 64, a phase delay element 65, a beam expander 66, a biaxially-turning mirror 67, and a polarization beam splitter 68. Also, the optical unit 4 includes a CMOS sensor 74 as an optical device irradiated with the second reference light.

Also, the optical unit 4 includes, as optical members constituting a light path through which the diffracted light passes, the objective lens 70, the quarter-wavelength plate 63, the polarization beam splitter 62, the Fourier transform lens 61, the pinhole 58, the Fourier transform lens 57, the polarization beam splitter 56, a Fourier transform lens 72, a Fourier transform lens 73, and a polarization beam splitter 68. Also, the optical unit 4 includes the CMOS sensor 74 as an optical device irradiated with the diffracted light.

In this configuration, the laser 41, the isolator 42, the shutter 43, the Fourier transform lens 44, the Fourier transform lens 45, the half-wavelength plate 46, and the polarization beam splitter 47 are optical members through which both the first reference light and the second reference light pass.

The polarization beam splitter 68 is an optical member through which both the diffracted light and the second reference light pass.

The polarization beam splitter 56, the Fourier transform lens 57, the pinhole 58, the Fourier transform lens 61, the polarization beam splitter 62, the quarter-wavelength plate 63, and the objective lens 70 are optical members through which both the diffracted light and the first reference light pass.

As described above, the first reference light and the diffracted light have at least the objective lens 70 as a common optical member, and thus the first reference light and the diffracted light coaxially pass through the objective lens 70 along the optical axis of the objective lens 70. Such a hologram reproducing apparatus is typically called a coaxial hologram reproducing apparatus.

Figure 15:
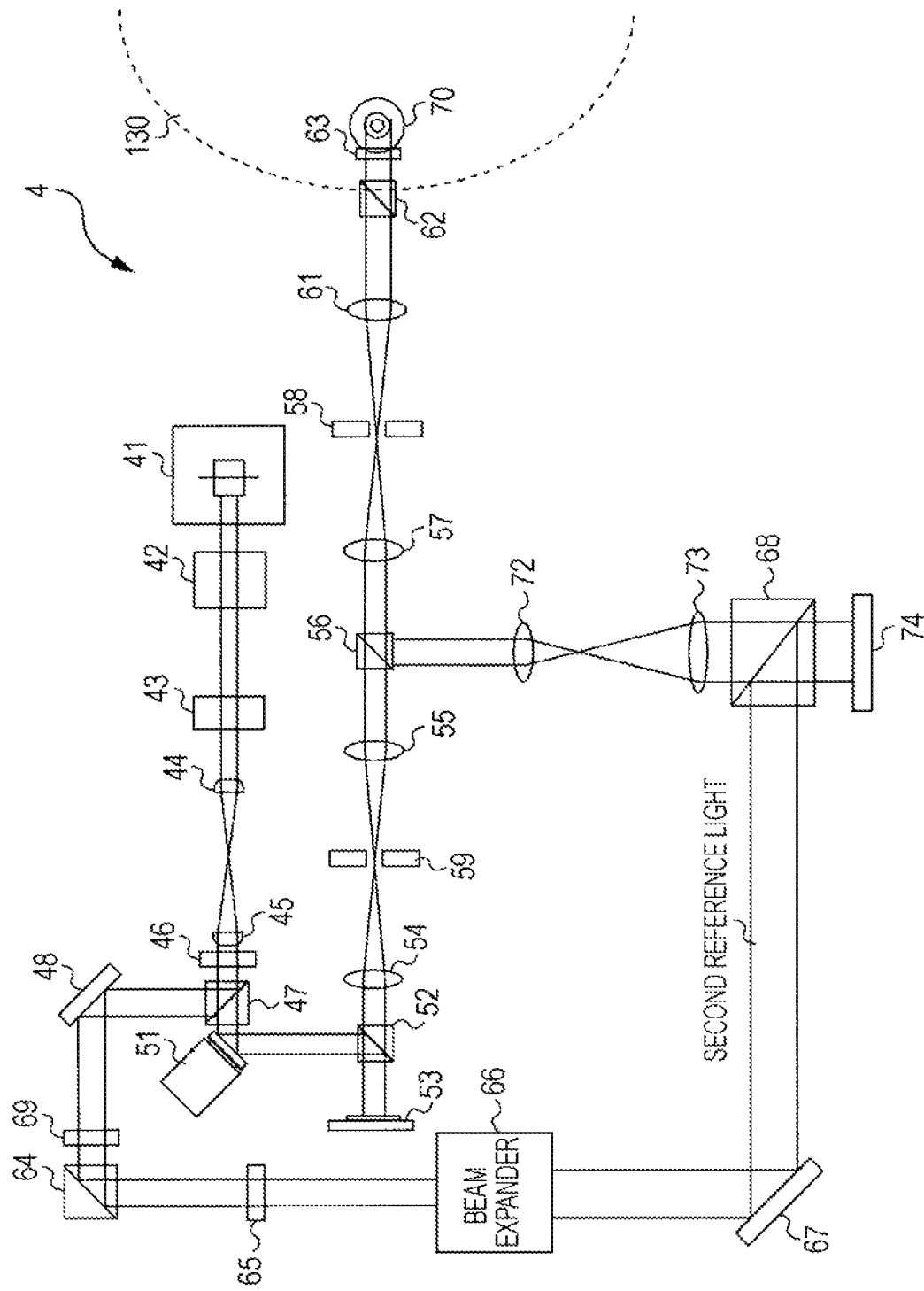
FIG. 15 is a schematic view mainly illustrating an optical unit of a hologram reproducing apparatus according to a fourth embodiment.

Now, a part related to reproducing of the optical unit 4 illustrated in FIG. 15 is briefly described in the range required to describe this embodiment.

The laser 41 is a blue laser in which the wavelength of laser light is 405 nm. The isolator 42 is used to prevent light from returning to the blue laser and to maintain single-mode oscillation. The shutter 43 is used to allow laser light to pass through or to block. The Fourier transform lenses 44 and 45 are used to increase the diameter of a light beam. By increasing the diameter of a light beam, a desired area of the spatial modulator 53, that is, a reference light area and a signal light area, can be irradiated with the light beam. The polarization beam splitter 47 is used to separate the first reference light and the second reference light. The movable mirror 51 is used to position laser light in the in-plane direction of a hologram recording layer of the hologram recording medium 130.

The spatial modulator 53 is used to display a predetermined pattern in the reference light area and perform spatial modulation on a light beam so as to obtain the first reference light, and performs phase modulation on laser light as in the above-described first to third embodiments. The polarization beam splitter 52 reflects a light beam from the movable mirror 51 so that the light beam travels toward the spatial modulator 53. The polarization direction of the reference light that has been modulated in the spatial modulator 53 is orthogonal to incident light with a difference of π/2, so that the reference light passes through the polarization beam splitter 52 and travels toward the Fourier transform lens 54.

The Fourier transform lenses 54 and 55 are used to form a focus point of a light beam. The pinhole 59 is placed at the focus point of the light beam. With this configuration, high-order diffracted light can be blocked, and a favorable shape of hologram to be recorded on the hologram recording medium 130 can be obtained during recording.

The polarization beam splitter 56 allows the reference light to travel toward the Fourier transform lens 57 and allows diffracted light (described below) to travel toward the Fourier transform lens 72. The Fourier transform lenses 57 and 61 are used to form a focus point of a light beam. The pinhole 58 is placed at the focus point so as to block high-order diffracted light.

The light beam passes through the polarization beam splitter 62 and further passes through the quarter-wavelength plate 63. The light beam is P waves before passing through the quarter-wavelength plate 63, but becomes S waves after turning back from the hologram recording medium 130 and passing through the quarter-wavelength plate 63 again. The objective lens 70 is driven by an actuator (not shown) in order to position the first reference light and the second reference light in the depth direction of the hologram recording layer of the hologram recording medium 130 and in the in-plane direction orthogonal to the depth direction. Also, the objective lens 70 leads the diffracted light to the path of the diffracted light.

The diffracted light passes through the objective lens 70, the quarter-wavelength plate 63, the polarization beam splitter 62, the Fourier transform lens 61, the pinhole 58, and the Fourier transform lens 57, is reflected by the polarization beam splitter 56, passes through the Fourier transform lens 72, the Fourier transform lens 73, and the polarization beam splitter 68, and is led to the CMOS sensor 74.

The second reference light is separated at the polarization beam splitter 47, passes through the mirror 48, the half-wavelength plate 69, the polarization beam splitter 64, the phase delay element 65, and the beam expander 66, is reflected by the biaxially-turning mirror 67, is further reflected by the polarization beam splitter 68, and is led to the CMOS sensor 74.

The first reference light, the second reference light, and the diffracted light pass through the above-described light paths, and then the diffracted light and the second reference light are added on the light receiving surface of the CMOS sensor 74, so that a light and dark image is reproduced as in the above-described first to third embodiments. Here, phase adjustment between the diffracted light and the second reference light is performed by the biaxially-turning mirror 67. The biaxially-turning mirror 67 has the same configuration and operation as those of the biaxially-turning mirror 18 according to the first embodiment.

Hereinafter, phase adjustment between the diffracted light and the second reference light according to the fourth embodiment is described. The phase adjustment is almost the same as that according to the first embodiment. In the first embodiment, phase adjustment in the corner portion Cc is performed by providing the phase delay element 16. On the other hand, in the fourth embodiment, no optical member for performing phase adjustment in the corner portion Cc is provided. In the fourth embodiment, phase adjustment in the corner portion Cc can be performed by using the phase delay element 65, having the same configuration as that of the phase delay element 16, in the same manner as in controlling the phase delay element 16 according to the first embodiment. Phase adjustment in the corner portions Dc and Ec is performed by using the biaxially-turning mirror 67 in the same manner as in controlling the biaxially-turning mirror 18 according to the first embodiment.

The hologram recording/reproducing apparatus according to the fourth embodiment can function as a coaxial hologram reproducing apparatus and can add a DC component in the CMOS sensor 74. In this case, the hologram recording medium 130 is not irradiated with the second reference light, and thus there is no risk that recorded information is damaged by the second reference light.

<Fifth Embodiment>

Figure 16:
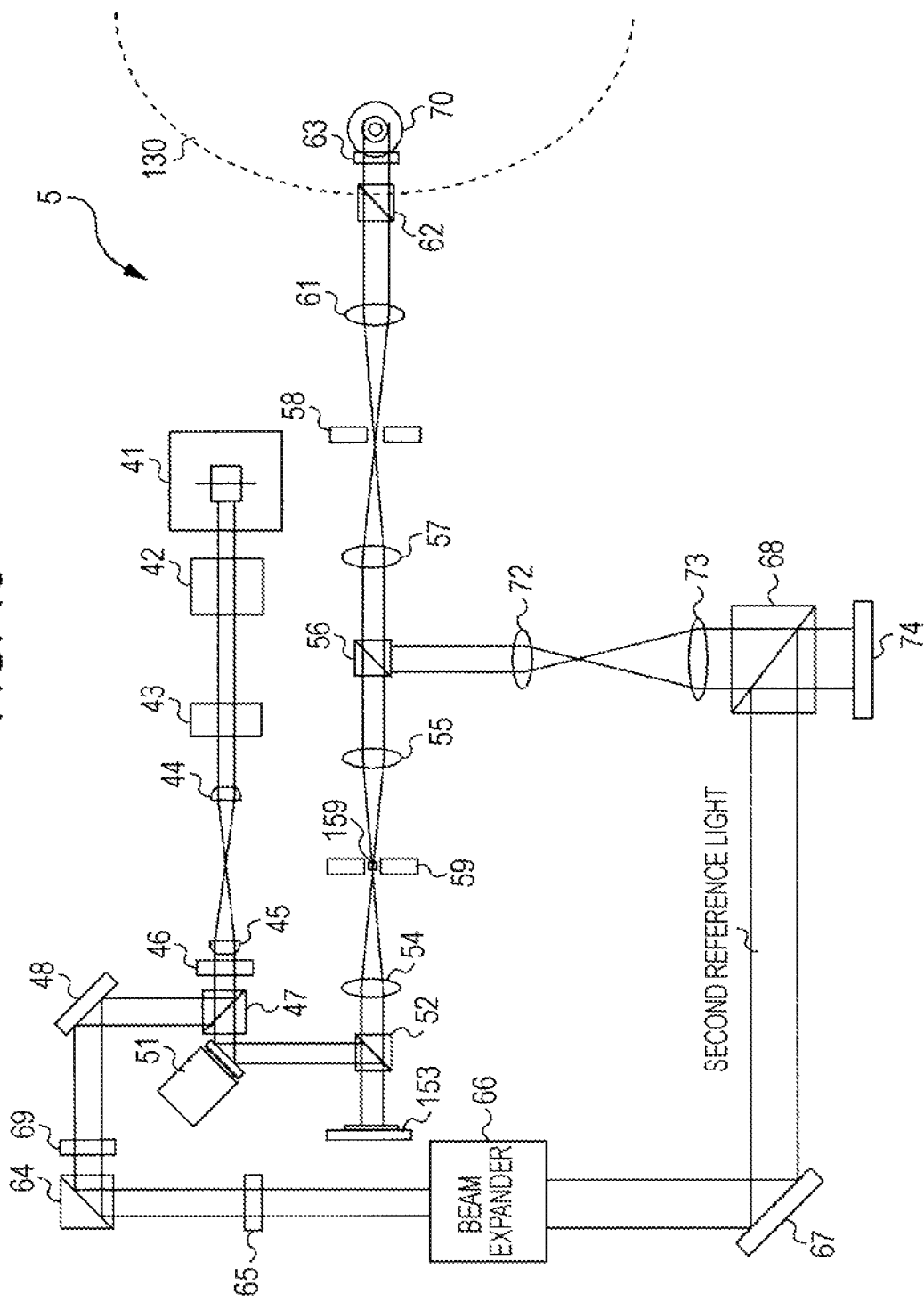
FIG. 16 is a schematic view mainly illustrating an optical unit of a hologram reproducing apparatus according to a fifth embodiment.

Hereinafter, a fifth embodiment is described with reference to FIG. 16. FIG. 16 illustrates another optical unit 5 of the hologram reproducing apparatus. In the optical unit 5 according to the fifth embodiment, the same parts as those of the optical unit 4 according to the fourth embodiment are denoted by the same reference numerals and the corresponding description is omitted. A different point between the optical units 4 and 5 is that a shielding plate 159 is provided in the optical unit 5. The shielding plate 159 is used to cut a DC component (zero-order light). A spatial modulator 153 modulates contrast, which is different from the spatial modulator 53 of the optical unit 4 that modulates a phase.

The optical unit 5 according to the fifth embodiment illustrated in FIG. 16 is also used for a hologram recording/reproducing apparatus using a so-called coaxial technique. The spatial modulator 153 modulates contrast, not phase. In this configuration, zero-order light is generated at the position of the pinhole 59. By providing the shielding plate 159, recording can be performed by cutting the zero-order light (DC component). The cut DC component can be restored by applying the second reference light during reproducing. That is, during reproducing of information that has been recorded on the hologram recording medium by cutting a DC component by providing the shielding plate 159, a favorable reproducing characteristic can be obtained by adding a DC component by using the second reference light.

In the hologram reproducing apparatus and hologram reproducing method according to the embodiments, a favorable reproducing characteristic can be obtained when information recorded on a hologram recording medium through phase modulation is reproduced. Furthermore, since the hologram recording medium is not irradiated with the second reference light, information recorded on the hologram recording medium can be prevented from being damaged by the second reference light.

In the phase modulating element according to the embodiments, the phase of laser light can be adjusted without having a mechanism unit. This configuration can be preferably used in the hologram reproducing apparatus according to the embodiments, and the apparatus can be miniaturized by using this phase modulating element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A hologram reproducing apparatus comprising:
a first reference light path leading laser light from a laser light source so that a hologram recording medium is irradiated with first reference light;
a diffracted light path leading diffracted light, generated from the hologram recording medium by irradiation with the first reference light, to a beam splitter, wherein the beam splitter bends the diffracted light and directs the diffracted light to a light receiving element having a plurality of pixels;
a second reference light path leading second reference light, having the same polarization direction as that of the diffracted light, from the laser light source through the beam splitter and to the light receiving element such that interference of the second reference light and the diffracted light is realized;
a phase modulating element provided in the second reference light path, the phase modulating element including a liquid crystal phase delay element to uniformly delay the phase in a traveling direction of the second reference light, and a biaxially-turning mirror to change the phases of two axis directions orthogonal to each other in a cross-sectional direction of the second reference light; and
a control system configured to adjust the phase modulating element so that the phase difference between the diffracted light and the second reference light in a light receiving surface of the light receiving element is adjusted within a predetermined range, wherein the control system adjusts the phase modulating element based on a signal obtained from a corner portion of the light receiving element.

2. The hologram reproducing apparatus according to claim 1, wherein the phase modulating element is a phase delay element including liquid crystal and two rigid optically-transparent plates sealing the liquid crystal, and causes change in phase of the second reference light by a first electrode and a second electrode orthogonal to the first electrode, the first and second electrodes being placed on the rigid plates so that potential gradient occurs.

3. The hologram reproducing apparatus according to claim 1, wherein the beam splitter reflects more light with said polarization direction than is allowed to pass through.

4. The hologram reproducing apparatus according to claim 1, wherein the second reference light path is provided with a beam expander that increases a diameter of the second reference light.

5. The hologram reproducing apparatus according to claim 4, wherein the diameter of the second reference light is expanded such that the second reference light completely covers the diffracted light at the light receiving element.

6. The hologram reproducing apparatus according to claim 1, wherein the phase difference is within a range of $\pm\pi/5$ (radian).

7. A hologram reproducing method comprising the steps of:
irradiating a hologram recording medium with first reference light from a laser light source;
generating diffracted light from the hologram recording medium based on the first reference light;
directing the diffracted light to a light receiving element by bending the diffracted light at a beam splitter;
generating second reference light having the same polarization direction as that of the diffracted light from the laser light source;
directing the second reference light to the light receiving element by passing the second reference light through the beam splitter, wherein interference of the second reference light and the diffracted light is realized;
receiving the diffracted light and the second reference light by the light receiving element including a plurality of pixels;
changing, by a phase modulating element, the phase of the second reference light in a plane of a traveling direction of the second reference light in accordance with a signal received by a corner portion of the light receiving element, the phase modulating element delaying the phase in a traveling direction of the second reference light with a liquid crystal phase delay element, and changing the phases of two axis directions orthogonal to each other in a cross-sectional direction of the second reference light with a biaxially-turning mirror; and
adjusting the phase difference between the diffracted light and the second reference light in a light receiving surface of the light receiving element within a predetermined range.

* * * * *